United States Patent
Dahlfort et al.

(10) Patent No.: US 9,178,755 B2
(45) Date of Patent: Nov. 3, 2015

(54) TIME-BASED LINK FAULT LOCALIZATION

(71) Applicant: Telefonaktiebolaget L M Ericsson (publ), Stockholm (SE)

(72) Inventors: Stefan Dahlfort, Santa Clara, CA (US); Peter Öhlén, Stockholm (SE); Kim Laraqui, Solna (SE); David Hood, Palo Alto, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 243 days.

(21) Appl. No.: 13/677,264

(22) Filed: Nov. 14, 2012

(65) Prior Publication Data

US 2014/0133845 A1    May 15, 2014

(51) Int. Cl.
    *H04B 10/079*    (2013.01)
    *H04L 12/24*     (2006.01)
    *H04B 10/077*    (2013.01)

(52) U.S. Cl.
    CPC ........ *H04L 41/0677* (2013.01); *H04B 10/0771* (2013.01); *H04B 10/0791* (2013.01)

(58) Field of Classification Search
    CPC ........... H04B 10/0771; H04B 10/0791; H04L 41/0677
    USPC ..................................................... 398/10–15
    See application file for complete search history.

(56) References Cited

U.S. PATENT DOCUMENTS

| | | | |
|---|---|---|---|
| 5,508,619 A | 4/1996 | Ozawa et al. | |
| 6,715,354 B2 | 4/2004 | Wooh | |
| 6,854,333 B2 | 2/2005 | Wooh | |
| 2004/0189317 A1 | 9/2004 | Borchert et al. | |
| 2008/0232795 A1 | 9/2008 | Klar et al. | |
| 2012/0224846 A1* | 9/2012 | Swanson et al. | ................ 398/13 |

FOREIGN PATENT DOCUMENTS

EP    1001271 B1    1/2007

OTHER PUBLICATIONS

"Speed of Sound," Nov. 3, 2012, 17 pages, Wikipedia, downloaded from http://web.archive.org/web/20121103193755/http://en.wikipedia.org/wiki/Speed of sound on Jun. 9, 2014.
D. Mills et al., "Network Time Protocol Version 4: Protocol and Algorithms Specification," Jun. 2010, 110 pages, Internet Engineering Task Force (IETF), Request for Comments: 5905, IETF Trust and the persons identified as the document authors.

(Continued)

*Primary Examiner* — Shi K Li
(74) *Attorney, Agent, or Firm* — Nicholson De Vos Webster & Elliott LLP

(57) ABSTRACT

Methods and apparatus for a network element or server end station to determine an estimated physical location of a fault in a communications link utilized by two network elements. In an embodiment, the first and second network elements generate link failure indications including time values representing when the respective network element detected the fault. In other embodiments, the link failure indications include time values transmitted over the communications link between the first and second network elements. A time distance between these time values is calculated, which is used to calculate the estimated physical location of the fault. In some embodiments, the link failure indications include sequence numbers transmitted or about to be transmitted over the communications link between the network elements. Sequence distances are calculated between the sequence numbers, and are used to calculate the estimated physical location of the fault.

24 Claims, 12 Drawing Sheets

(56) References Cited

OTHER PUBLICATIONS

"Network Time Protocol," 8 pages, Wikipedia, downloaded from http://en.wikipedia.org/wiki/Network_Time_Protocol on Nov. 14, 2012.

IEEE Standard for a Precision Clock Synchronization Protocol for Networked Measurement and Control Systems, *IEEE Std 1588-2008 (Revision of IEEE Std 1588-2002)*, (2008), 1-269.

"Part 11: Wireless LAN Medium Access Control (MAC) and Physical Layer (PHY) Specifications", *IEEE 802.11-2012; IEEE Standard for Information technology; Telecommunications and information exchange between systems; Local and metropolitan area networks; Specific requirements*, (Mar. 29, 2012), 2793 pages.

Notice of Allowance, U.S. Appl. No. 13/677,263, dated Dec. 5, 2014, 17 pages.

Non-Final Office Action for U.S. Appl. No. 13/797,589, mailed May 22, 2015, 14 pages.

\* cited by examiner

TIME-BASED LINK FAULT LOCALIZATION

FIELD

Embodiments of the invention relate to the field of networking; and more specifically, to the determination of an estimated physical location of a fault in a communications link.

BACKGROUND

Many communication networks rely upon tangible communication links (e.g., twisted pair copper cabling, coaxial cable, optical fiber) to provide a transmission medium between nodes of the network. While physical communication links provide numerous benefits such as speed and security, such links are vulnerable to defects or breakage that can degrade or destroy network functionality. Such defects are expensive in terms of both the labor and time required to locate and repair the link, in addition to the cost of loss of service during this time. Accordingly, it is of the utmost of importance to be able to efficiently monitor and troubleshoot network communication links to ensure network availability.

One device commonly used for characterizing optical fiber is an Optical Time Domain Reflectometer (OTDR). An OTDR can perform a variety of tasks with optical fiber, including estimating the fiber's length, estimating overall attenuation, and estimating locations of faults. The OTDR injects optical signals into the fiber, parts of which are reflected back towards the OTDR device. These back reflected (i.e., backscattered) OTDR signals allow the OTDR to perform calculations to estimate the length of the fiber and estimate physical locations of faults in the fiber.

In many applications, OTDRs are centralized within a few locations in the network. However, OTDRs have limitations regarding how large of a fiber-optic cable plant can be supported with respect to the lengths of fiber utilized and the number of node hops involved. In other applications, portable OTDR devices are manually utilized by service personnel, but this configuration is especially expensive in terms of time and labor cost (as manual human labor is required). Accordingly, it would be desirable to have a semi-automatic or fully-automatic solution for detecting and localizing network faults without the need for human intervention or additional hardware components. Further, it would be desirable to have such a solution that works for both optical and metallic cabling.

SUMMARY

A method for determining an estimated physical location of a fault in a physical communications link utilized by a first network element and a second network element is described. According to an embodiment of the invention, the method includes receiving a first link failure indication from the first network element. The first link failure indication includes a first sequence number from a first plurality of bits received by the first network element over the physical communications link from the second network element. This first sequence number belongs to a first sequence. The first link failure indication also includes a second sequence number that, as of a time when the first network element detected that the fault occurred, was either just transmitted or about to be transmitted by the first network element to the second network element over the physical communications link as part of a second plurality of bits. This second sequence number belongs to a second sequence. The method further includes calculating the estimated physical location of the fault based upon the first sequence number, the second sequence number, a third sequence number, and a fourth sequence number. The third sequence number belongs to the second sequence and is from the second plurality of bits received by the second network element over the physical communications link from the first network element. The fourth sequence number belongs to the first sequence and was either just transmitted or about to be transmitted by the second network element to the first network element over the physical communications link as part of the first plurality of bits as of a time when the second network element detected that the fault occurred.

In an embodiment of the invention, a first network element is described that is to determine an estimated physical location of a fault in a physical communications link to be utilized by the first network element and a second network element. The first network element includes a set of one or more physical network interfaces, which are configured to transmit, to the second network element over the physical communications link, a first plurality of bits that are to include a plurality of sequence numbers belonging to a first sequence. The set of physical network interfaces are also configured to receive, from the second network element over the physical communications link, a second plurality of bits that are to include a plurality of sequence numbers belonging to a second sequence. The set of physical network interfaces are further configured to receive, from the second network element, a first link failure indication. The first link failure indication is to include a first sequence number from the first plurality of bits received by the second network element over the physical communications link. The first sequence number is to belong to the first sequence. The first link failure indication is also to include a second sequence number of the second sequence that, as of a time when the second network element detected that the fault occurred, was either just transmitted or about to be transmitted by the second network element to the first network element over the physical communications link as part of the second plurality of bits. The first network element also includes a link fault detection module configured to detect that the fault of the physical communications link has occurred, and in response generate a second link failure indication. The second link failure indication is to include a third sequence number from the second plurality of bits that is to belong to the second sequence, and a fourth sequence number of the first sequence that, as of a time of said detection that the fault occurred by the link fault detection module, was either just transmitted or about to be transmitted by the first network element to the second network element over the physical communications link as part of the first plurality of bits. The first network element also includes a link fault localization module, which is configured to calculate the estimated physical location of the fault based upon the first sequence number, the second sequence number, the third sequence number, and the fourth sequence number.

According to an embodiment of the invention, an apparatus is described that is to determine an estimated physical location of a fault in a physical communications link to be utilized by a first network element and a second network element. The apparatus includes a set of one or more physical network interfaces configured to receive, from the first network element, a first link failure indication. The first link failure indication is to include a first sequence number from a first plurality of bits received by the first network element from the second network element over the physical communications link. The first sequence number is to belong to a first sequence. The first link failure indication is also to include a second sequence number of a second sequence that, as of a time when the first network element detected that the fault occurred, was either just transmitted or about to be transmitted by the first network element to the second network element over the physical communications link as part of a second plurality of bits. The set of one or more physical network interfaces is also configured to receive, from the second network element, a second link failure indication. The second link failure indication is to include a third sequence number from the second plurality of bits received by the second network element over the physical communications link. The third sequence number is to belong to the second sequence. The second link failure indication is also to include a fourth sequence number of the first sequence that, as of a time when the second network element detected that the fault occurred, was either just transmitted or about to be transmitted by the second network element to the first network element over the physical communications link as part of the first plurality of bits. The apparatus also includes a link fault localization module configured to calculate the estimated physical location of the fault based upon the first sequence number, the second sequence number, the third sequence number, and the fourth sequence number.

Embodiments of the invention utilize time values and/or timestamps to localize link fault locations.

A method according to an embodiment of the invention is described for determining an estimated physical location of a fault in a physical communications link utilized by a first network element and a second network element. The method includes receiving a first link failure indication from the first network element. The first link failure indication includes a first time value that was generated by the first network element or received by the first network element from the second network element over the physical communications link. The method further includes determining a time distance between the first time value and a second time value. The second time value was generated by the second network element or received by the second network element from the first network element over the physical communications link. The method further includes calculating the estimated physical location of the fault based upon the time distance.

According to an embodiment of the invention, a first network element is described that is to determine an estimated physical location of a fault in a physical communications link that is to be utilized by the first network element and a second network element. The first network element includes a set of one or more physical network interfaces, a link fault detection module, and a link fault localization module. The set of one or more physical network interfaces is configured to transmit, to the second network element, a first plurality of bits over the physical communications link. The set of physical network interfaces is further configured to receive, from the second network element, a second plurality of bits over the physical communications link. The set of physical network interfaces is also configured to receive, from the second network element, a first link failure indication that is to include a first time value generated by the second network element or received by the second network element from the first network element over the physical communications link. The link fault detection module is configured to detect that the fault of the physical communications link has occurred, and in response generate a second link failure indication that is to include a second time value. The link fault localization module is configured to determine a time distance between the first time value and the second time value, and calculate the estimated physical location of the fault based upon the time distance.

In an embodiment, an apparatus is described that is to determine an estimated physical location of a fault in a physical communications link to be utilized by a first network element and a second network element. The apparatus includes a set of one or more physical network interfaces. This set of physical network interfaces is configured to receive, from the first network element, a first link failure indication that is to include a first time value that is to be generated by the first network element or received by the first network element from the second network element over the physical communications link. The set of physical network interfaces is also configured to receive, from the second network element, a second link failure indication that is to include a second time value. The second time value is to be generated by the second network element or received by the second network element from the first network element over the physical communications link. The apparatus also includes a link fault localization module. The link fault localization module is configured to determine a time distance between the first time value and the second time value, and calculate the estimated physical location of the fault based upon the time distance.

Accordingly, disclosed embodiments of the invention allow for rapid and accurate localization of link faults without the need for additional hardware or physical labor.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
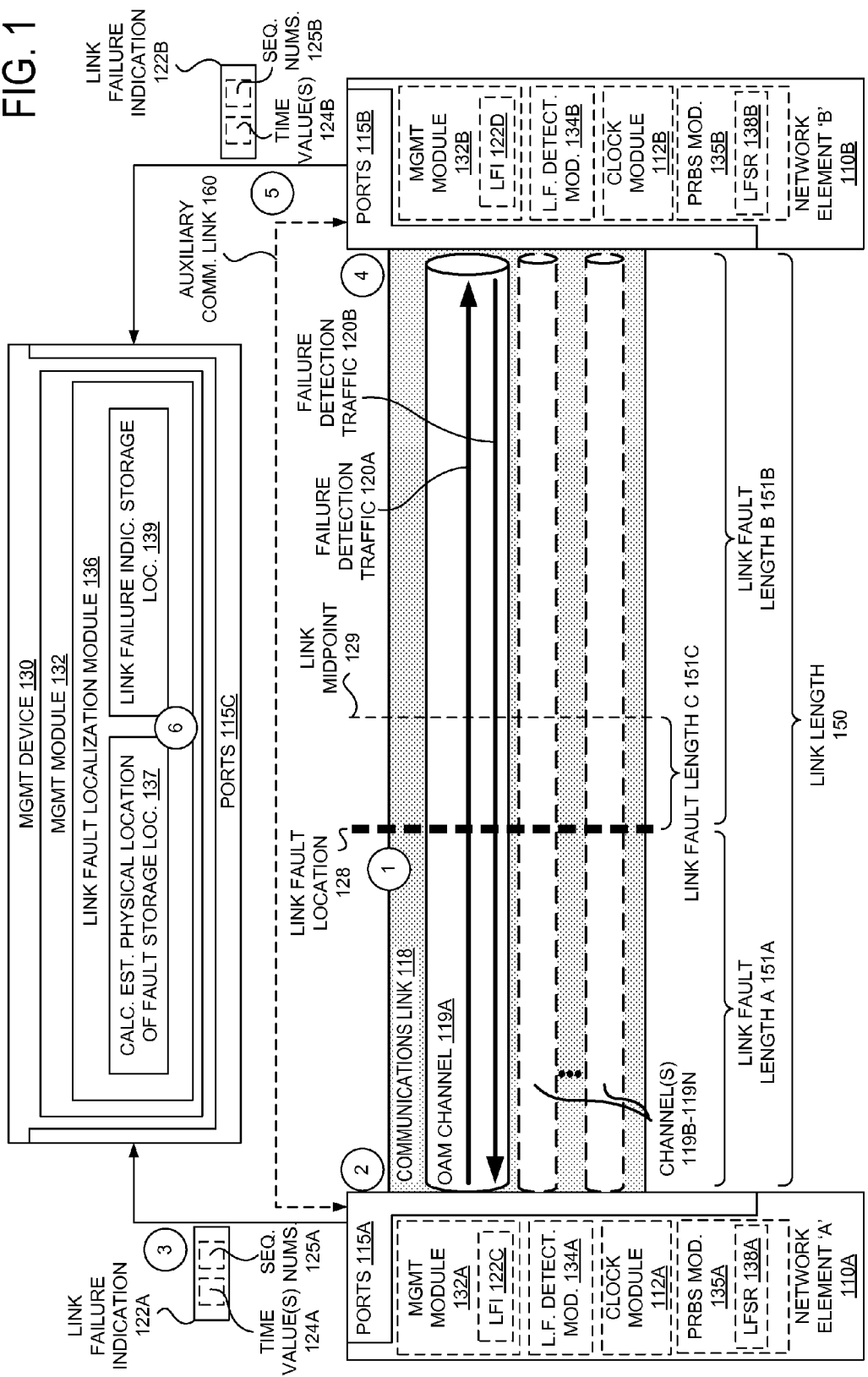
FIG. 1 illustrates a communications network including a fault of a communications link between two network elements according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device (e.g., an end station, a network element) stores and transmits (internally and/or with other electronic devices over a network) code (composed of software instructions) and data using computer-readable media, such as non-transitory tangible computer-readable media (e.g., computer-readable storage media such as magnetic disks; optical disks; read only memory; flash memory devices) and transitory computer-readable transmission media (e.g., electrical, optical, acoustical or other form of propagated signals—such as carrier waves, infrared signals). In addition, such electronic devices typically include a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory computer-readable medium of a given electronic device typically stores instructions for execution on one or more processors of that electronic device. One or more parts of an embodiment of the invention may be implemented using different combinations of software, firmware, and/or hardware.

As used herein, a network element (e.g., a router, switch, bridge) is a piece of networking equipment, including hardware and software, which communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics.

Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)). By way of example, a service card may be used to terminate IPsec tunnels and execute the attendant authentication and encryption algorithms.

In some embodiments of the invention, network elements at each end of a communications link detect an unacceptably low quality of a communications channel of the link caused by a fault. This unacceptably low quality may be detected in a number of ways, including a direct Loss of Signal (LOS) indication from an optical receiver, or a failure to receive one or more expected values ranging from an incorrect bit to an incorrect code word to an incorrect packet. In these embodiments, a location of the fault can be determined based upon the respective time values representing the times that each network element respectively detected this low link quality.

Additionally, embodiments of the invention utilize traffic transmitted on a physical communications link—such as timestamps or sequence numbers—to locate a failure that occurs along a link. In these embodiments, by performing an analysis of what data was sent and/or received on each end of a link, a location of a fault of that link can be determined. In some embodiments, this traffic is transmitted utilizing out-of-band optical layer Operations, Administration and Management (OAM) communications data, which allows for fine-grained control of the traffic transmitted on the communications link. However, other embodiments utilize a dedicated fault-monitoring channel to carry traffic useful for detecting and localizing faults. In still other embodiments, fault monitoring information may be interleaved along with ordinary bearer traffic on the communications link.

While many embodiments disclosed herein illustrate the invention in terms of optical communication links and OAM channels, other embodiments of the invention utilize non-optical links such as twisted pair copper, coaxial, etc. Thus, methods of the invention are generally applicable to nearly any physical layer communication system. However, the accuracy of fault localization will depend upon the characteristics of the communication system. When the communication system allows for full control over the characteristics—such as in OAM out-of-band communications—the accuracy is relatively high. However, when the communication system does not allow control over the characteristics of the traffic on the link (e.g. bursts of packets being transmitted, packets of varied length, poor clock quality, etc.), the accuracy may be reduced.

FIG. 1 illustrates a communications network including a fault 128 of a point-to-point communications link 118 between two network elements 110A-110B according to one embodiment of the invention. In the depicted embodiment, the communications link 118 provides an OAM channel 119A used for network administrative traffic and a plurality of other channels 119B-119N to provide data transmission for other network traffic. Network element 'A' 110A, network element 'B' 110B, and the management device 130 each include a set of ports (115A, 115B, and 115C, respectively) allowing for communications using the network. In some embodiments, network element 'A' 110A and network element 'B' 110B are also connected by an auxiliary communications link 160 that may be wired (e.g. optical fiber link, Category 5 or 6 cable, etc.) or wireless (e.g., Institute of Electrical and Electronics Engineers (IEEE) 802.11, cellular, satellite, etc.). In an embodiment of the invention, the communications link 118 is a fiber-optic link and each of the network elements 110A-110B are optical switches employing Dense Wavelength-division Multiplexing (DWDM), but in other embodiments these elements and technologies differ.

FIG. 1 also illustrates a management device 130 including a management module 132 capable of determining an approximate location of a fault using a link fault localization module 136. In some embodiments, though, a management device 130 is not utilized; rather, one or both of network element 'A' 110A and network element 'B' 110B include a management module (132A, 132B) that provides the same or similar functionality of the management module 132 of the management device 130. Further, the management modules (132A, 132B) of the network element (110A, 110B) may include any of the modules or components (e.g., 136, 137, 139) of the management module 132 in the management device 130.

Throughout the operation of the communications link 118, network element 'A' 110A and network element 'B' 110B will utilize the one or more channels 119A-119N of the communications link 118 to transmit data to and receive data from the other network element. However, at an instant of time (or possibly, over an interval) the communications link 118 may develop a link fault 128 that impairs or eliminates the ability of the communications link 118 to transmit data between the network elements 110A-110B. This link fault 128 affects traffic traveling in both directions—thus, traffic from network element 'A' 110A to network element 'B' 110B will be affected as well as traffic from network element 'B' 110B transmitted to network element 'A' 110A.

At the instant of time when the link fault occurs, any in-transit data that has already passed the location of the link fault 128 will arrive at the respective network element (110A, 110B) without errors due to the link failure. However, any in-transit data that has not passed the link fault location 128 at the time of the link fault will arrive with errors due to the link failure or will not arrive at all. Similarly, any data transmitted by either network element (110A, 110B) subsequent to the occurrence of the link fault will also arrive with errors due to the link failure or will not arrive at all.

The illustrated communications link 118 includes a link fault location 128 at a point between the link midpoint 129 and network element 'A' 110A. According to embodiments of the invention, by the network element 'A' 110A and network element 'B' 110B transmitting and receiving failure detection traffic 120A-120B, the management module 132 is able to determine a location of the link fault 128. In some embodiments, the determined location is a distance from network element 'A' 110A to the link fault 128 (i.e. link fault length 'A' 151A), a distance from the network element 'B' 110B to the link fault 128 (i.e. link fault length B 151B), or a distance from the link midpoint 129 to the link fault 128 (i.e. link fault length C 151C).

Because both of network element 'A' 110A and network element 'B' 110B have full control over what is transmitted on the communications link 118 as the failure detection traffic 120A-120B, the network elements 110A-110B may insert or modify this traffic to include particular time values or sequence numbers according to a particular configuration. Then, upon a network element (e.g., 110A) detecting the link fault, that network element will transmit a link failure indication 122A to the management module 132. The link failure indication 122A may include one or more time values 124A and/or one or more sequence numbers 125A. In various embodiments, the time values 124A may include one or more of a time provided by a clock module 112A of the network element 110A representing the point in time when the link fault was initially detected, a timestamp from within a last valid received packet received before the link fault was detected, and a time value from the clock module 112A indicating when a last valid packet was received before the link fault was detected. Additionally, in various embodiments, the sequence numbers 125A may include one or more of a sequence number from within a last valid packet received as failure detection traffic 120B on the OAM channel 119A before the fault was detected, a next sequence number to be used when sending failure detection traffic 120A on the OAM channel 119A, or a last sequence number that was used to transmit failure detection traffic 120A on the OAM channel 119A. In an embodiment, the sequence numbers 125A are from a Pseudo-Random Binary Sequence (PRBS) generated by a PRBS module (e.g. 135A, 135B). In certain embodiments using a PRBS, the PRBS is generated by a Linear Feedback Shift Register (LFSR) (e.g., 138A, 138B). In other embodiments, other similar time values and/or sequence numbers may be used.

The management module 132, in some embodiments, caches received link failure indications (e.g., 122A-122B). With the received link failure indications 122A-122B from each side of the communications link 118, the link fault localization module 136 is able to determine the link fault location 128 by calculating a link fault distance from a known reference point (e.g., 151A, 151B, 151C). In various embodiments of the invention, the calculation to determine the link fault length may further utilize a link length 150 of the communications link 118, a round trip time (RTT) of the communications link 118, or a propagation speed of the communications link 118. In some embodiments, the determined link fault location 128 may be the calculated link fault length, and in other embodiments the determined link fault location 128 may be a geographic location identifier based upon the calculated link fault length. The determined link fault location may further be stored by the link fault localization module 136 as the calculated estimated physical location of the fault 137.

In embodiments of the invention, the failure detection traffic 120A-120B includes packets that are time-stamped as of the time of transmission, or packets/datagrams including sequence numbers, or a well-known sequence or pattern transmitted as at least part of a bitstream or as part of packet payloads.

In an embodiment where the failure detection traffic 120A-120B is transmitted over an OAM channel 119A of the communications link 118, time-stamps or sequence numbers to be placed within packets could be placed within an overhead portion of OAM packets. In some embodiments, these timestamps or sequence values could be placed in the payload of these packets (e.g. dedicated packets are sent to contain these timestamps or sequence values). However, these choices introduce a trade-off between OAM traffic impact and the accuracy of the estimated link fault location. In particular, the trade-off between these techniques involves space in packet overhead, presumably in every packet, which is one type of reduction of efficiency. An alternative is to send dedicated packets, with presumably shorter packet overheads; but then the reduced efficiency is represented by the proportion of dedicated packets. In both cases, the size of the packets, or the rate at which dedicated packets can be injected into the stream, affects the resolution of a method that looks only at time stamps (rather than looking inside the packets). In certain embodiments, the insertion of sequence numbers is precisely spaced in time (i.e. at well-defined, precise intervals) so as to allow for increased certainty in the fault location results derived therefrom.

In an embodiment, the link fault localization module 136 computes a distance between the time values or sequence numbers reported by the network elements 110A-110B. This distance, which is described here as the result of a generic dist( ) function that returns a number of sequence steps to move from one sequence number to another (or, in a more specific case, an amount of time between two time values), may be transformed using the length 150 of the link, the RTT of the link, or the propagation speed of the link to allow for the determination of the link fault location 128. Further detail regarding these computations is presented later herein.

In embodiments where the link failure indications 122A-122B include timestamps (from received traffic, transmitted traffic, and/or generated by the network elements 110A-110B), the link fault location 128 can be determined using the timestamps and the RTT of the communications link. The spatial resolution of the link fault location is only limited by the time stamp accuracy and resolution along with the size/length of the data units transmitted as part of the failure detection traffic 120A-120B. For example, if an unbroken series of 64-byte packets is transmitted at gigabit Ethernet speeds (i.e. 1 Gigabit per second (Gbps)), the resolution of the link fault location will be within approximately 100 meters, as 64 bytes will be transmitted in 512 nanoseconds at 1 Gbps, and 1 microsecond is approximately 200 meters at the propagation speed of a fiber-optic cable.

To improve fault location estimation accuracy, embodiments of the invention implement a synchronization scheme to synchronize the clocks of the network elements 110A-110B, thus enabling timestamps to be generated in a common frame of reference. In some embodiments, each clock module 112A-112B utilizes the Network Time Protocol (NTP) (Internet Engineering Task Force (IETF) Request for Comments (RFC) 5905) to keep its respective clock synchronized, though other embodiments may utilize other clock synchronization schemes including but not limited to Precision Time Protocol (Institute of Electrical and Electronics Engineers (IEEE) 1588 standard) or Global Positioning System (GPS). In other embodiments, the management module 132 is able to transform timestamps reported by one or both of the network elements 110A-110B into a common frame of reference.

In one embodiment utilizing timestamps, the link fault location 128 is computed in the following manner. First, at circle '1' the link fault 128 occurs in the communications link 118. In the depicted embodiment of FIG. 1, the link fault 128 is slightly closer to network element 'A' 110A than to network element 'B' 110B, so network element 'A' 110A will detect the existence of the link fault before network element 'B' 110B. Thus, at circle '2' the link fault detection module 134A of network element 'A' 110A detects the existence of the fault. At this point, at circle '3' network element 'A' 110A transmits a link failure indication 122A including a first time value 124A (or, in some embodiments, more than one time value) to the management device 130. In some embodiments, the time value is generated by the clock module 112A of network element 'A' 110A at the time that network element 'A' 110A detects the existence of the link fault (e.g. detecting a LOS of the link, detecting a number of faulty bits/packets/code words, etc.); in other embodiments, the time value is a timestamp from a packet transmitted by network element 'B' 110B as part of the failure detection traffic 120B. In other embodiments, the time value is a time that the network element determined it first received a faulty packet due to the fault (or didn't receive an expected packet, etc.). In an embodiment where the time value is a timestamp from a packet transmitted by network element 'B' 110B, the packet is a last packet of the failure detection traffic 120B received before network element 'A' 110A detects the link fault. The management module 132 may store the received link failure indication 122A in a link failure indications storage location 139.

At circle '4', the link fault detection module 134B of network element 'B' 110B detects the existence of the link fault. In this depicted example, circle '4' occurs after network element 'A' transmits the link failure indication 122A at circle '3'. It is also possible that in practice, circle '4' will occur before circle '3' because the propagation speed of the communications link 118 may be faster than the ability of network element 'A' 110A to detect the fault and transmit the link failure indication 122A. At circle '5', network element 'B' 110B transmits a link failure indication 122B including a second time value 124B (or, in some embodiments, multiple time values) to the management device 130. Similar to the first time value 124A, the second time value 124B may be a time value generated by the clock module 112B when the network element B' detects the existence of the link fault, or a timestamp from a packet transmitted by network element 'A' as part of failure detection traffic 120A. In an embodiment where the time value is a timestamp from a packet transmitted by network element 'A' 110A, the packet is a last packet of the failure detection traffic 120A received before network element 'B' 110B detects the link fault. The management module 132 may store the received link failure indication 122B in the link failure indications storage location 139. In some embodiments, at circle '5' network element B' 110B transmits the link failure indication 122B to network element 'A' 110A over the non-failed auxiliary communications link 160, and this link failure indication 122B can be utilized by management module 132A together with a link failure indication 122C generated by the link failure detection module 134A (or generated by the management module 132A) of network element 'A' 110A to calculate an estimated physical location of the link fault 128. In other embodiments, the mirror of the depicted embodiment occurs, as network element 'A' 110A will transmit its link failure indication 122A to network element 'B' 110B via auxiliary communications link 160, which can be utilized by its management module 132B, along with a link failure indication 122D generated by the link failure detection module 134B (or generated by the management module 132B) of network element 'B' 110B, to calculate the estimated physical location of the link fault 128.

In embodiments where the first time values 124A and second time values 124B are not synchronized in a time reference system, the link fault localization module 136 transforms each value to a same time reference system. These time values 124A-124B are then utilized at circle '6' to calculate an estimated physical location of the link fault 128.

In certain embodiments, the calculation of the estimated physical location of the link fault 128 is a two-step process. First, a time or sequence distance between the time values 124A-125B or sequence numbers 125A-125B is generated, which allows for the calculation of a proportional location associated with the link fault location 128. In a second step, the proportional location is scaled to determine a geographic location of the link fault through reference to auxiliary information related to a characteristic of the communications link 118, such as a propagation speed of the communications link 118, a physical length 150 of the communications link 118, and/or a propagation delay of the communications link 118. In other embodiments, other metadata describing aspects of the communications link 118 may be used for the scaling purposes. Certain exemplary formulas for the first stage time value distance calculation and the second stage scaling calculation are described herein; however, many variations of these formulas exist such that a person of skill in the art is able to modify the formulas to utilize different steps or data values to achieve a same result.

From a high level standpoint—assuming all time values are synchronized in a common time reference system—if the first time value 124A is equal to the second time value 124B, then the failure should be precisely at the middle of the link 129 because evidence of the fault took an equal amount of time to reach each end of the link. If the first time value 124A is less than (i.e. is earlier than) the second time value 124B, then the failure should be located closer to network element 'A' 110A. Similarly, if the first time value 124A is greater than (i.e. occurs after) the second time value 124B, then the failure should be located closer to network element 'B' 110B.

In some embodiments, calculation of the time value distance and the proportional scaling are computed in just one step. Using the time values 124A-124B and the propagation speed of the communications link 118 (e.g., for a fiber-optic link, approximately $2*10^8$ m/s), the link fault localization module 136 may be configured to compute a distance (i.e. link fault length 'C' 151C) from the link midpoint 129 to the link fault 128 using the following formula (where the sign of the result indicates which side of the midpoint includes the fault):

$$\text{Length\_C} = 0.5 * (\text{second\_time\_value} - \text{first\_time\_value}) * \text{propagation\_speed}$$

The link fault localization module 136 may also be configured to calculate the estimated physical location of the fault as a distance from one of the network elements 110A-110B. In an embodiment, the link fault localization module 136 calculates a time value distance utilizing the time values 124A-124B and scales that distance using the propagation speed of the communications link and a round trip time (RTT) of the communications link, which can be defined, derived, or measured by the network elements 110A-110B through well-known means such as transmitting a unit of information on the communications link and determining how much time is required for a response to be received.

Accordingly, the link fault length 'A' 151A may be computed according to the following formula:

$$\text{Length\_A} = 0.25 * \text{propagation\_speed} * [\text{RTT} - 2*(\text{second\_time\_value} - \text{first\_time\_value})]$$

Similarly, the link fault length 'B' 151B may be computed according to the following formula:

$$\text{Length\_B} = 0.25 * \text{propagation\_speed} * [\text{RTT} - 2*(\text{first\_time\_value} - \text{second\_time\_value})]$$

Each length formula (Length_A, Length_B, Length_C) is fairly generic and can be used with a wide variety of configurations. Additionally, the time values may be generated in a wide variety of ways.

In an embodiment, a time value is generated by a clock module (e.g. 112A) upon the network element (e.g. network element 'A' 110A) first determining that there is likely a fault with the network link. In one embodiment, a likely fault is determined when the network element detects a determined number of errored packets. For example, this likely fault may be defined as occurring at the beginning of an interval during which a particular number of consecutive errored packets are received, or when a particular number or percentage of errored packets are received over a particular time range. While the detection of a link failure is well understood by those of skill in the art, detection could involve one or more of detection of a loss of signal (LoS), a failure of a frame check sequence (FCS), checksum scheme (e.g., parity bits, check digits, etc.), cyclic redundancy check (CRC), code word violations, a degradation in optical power, an increase in a bit error rate (BER), problems in repetition codes or error-correcting codes, etc. In some embodiments, each time value would then have the intrinsic uncertainty of the fault happening between the end of a last valid packet to the end of the first invalid (i.e. errored) packet, which may further be complicated by variations in packet length (e.g., jumbo frames) and inter-packet gaps (such as a burst mode upstream channel in a Gigabit-capable Passive Optical Network (GPON)).

However, in wavelength-division multiplexing (WDM) systems utilizing a plurality of channels, errored packet information from many channels can be correlated to improve the accuracy of the calculated estimated fault location. For example, in some embodiments with many communication channels transiting one communications link, information from each of the channels (e.g. errored packet information, sequence numbers, timestamps, etc.) can be collectively used together to generate the time value of the failure. In such embodiments, if an approximate time of failure is generated independently for each of a plurality of channels, these approximate time values may be averaged to generate more accurate failure time estimations. Alternatively, in other embodiments, the earliest one of the plurality of computed approximate failure detection times is used as the estimated time value of the failure signature.

In some embodiments, resolution of the estimated fault location is improved by the use of bitstreams as the failure detection traffic 120A-120B. For example, a Pseudo-Random Binary Sequence (PRBS) can be interleaved into the bit stream In a similar manner, a Forward Error Correction (FEC) block (such as a Reed-Solomon code) can be used to more accurately determine a particular location that indicates the onset of a link fault. At the technical limit, the distance resolution of the link fault location based upon a first failed bit location would be in the sub-meter range.

An alternate embodiment utilizing sequence numbers involves the use of counters by each of the network elements 110A-110B. In an embodiment, each of the network elements 110A-110B transmits a counter reset message to reset a simple counter. For example, at the instant of transmission of the counter reset message from network element 'A' 110A to network element 'B' 110B, network element 'A' 110A resets a counter. This counter may have a well-defined increment tied to the transmission of bits, such as "every 128th transmitted bit, the counter increments by 1." Upon receipt of the counter reset message, network element 'B' 110B would reset its corresponding counter. Then, as data is transmitted by network element 'A' 110A and received by network element 'B' 110B, each network element will increment the respective counter according to the defined counter increment. This same procedure is also used in the reverse direction (i.e. from network element 'B' 110B to network element 'A' 110A) to synchronize a second pair of counters. For example, network element 'B' 110B will transmit a counter reset message and reset a second counter. Upon receipt of the counter reset message, network element 'A' 110A will reset its second counter. In an embodiment, the counters at each end are automatically reset according to mutually agreed upon instants of the mutually synchronized clocks, such as at the beginning of each millisecond. Eventually, at the time of the detection of a link failure, the values of these four counters are used as the sequence numbers 125A-125B sent to the management module 132, which calculates sequence distances between the first set of counters and the second set of counters that can be used to calculate the estimated physical location of the link fault 128.

In embodiments utilizing packets as the failure detection traffic 120A-120B, failure location resolution accuracy can be improved through the use of short dedicated packets that are transmitted back-to-back (i.e. having small inter-packet gaps). In those embodiments utilizing an OAM channel 119A for failure detection traffic 120A-120B transmission this may be easily implemented as each of the network elements 110A-110B has full control over that channel. For example, if the network elements 110A-110B do not have any traditional OAM traffic to send over the channel 119A, fault monitoring frames can be transmitted instead. Similarly, the network elements 110A-110B may have the ability to fragment large OAM traffic batches into small packets. Although this can reduce the efficiency of the traditional OAM traffic (as more packets require more packet header and processing overhead), this significantly increases the estimated failure location resolution accuracy. Of course, similar techniques may be applied to embodiments using a non-OAM channel (e.g., channel 119B) or non-channelized media, as with the addition of suitable fault monitoring overhead, regular data traffic can also serve as failure detection traffic 120A-120B.

While the system illustrated in FIG. 1 includes a separate management device 130 including a management module 132, embodiments of the invention have the management module 132 as part of one or both of network element 'A' 110A and network element 'B' 110B (see management module 132A-132B). For example, in an embodiment where the management module 132 exists as part of network element 'A' 110A, the link failure indication 122A is still generated by network element 'A' 110A but may not be transmitted to another device as it is directly provided to the management module 132A. However, in this embodiment, network element 'B' 110B still generates and transmits the link failure indication 122B, but it is instead transmitted over the auxiliary communications link 160 to network element 'A' 110A (because the communications link 118 is faulty). In some embodiments, the management module 132 exists as part of both network elements 110A-110B, and each network element will transmit its generated link failure indication 122A-122B to the other network element over the auxiliary communications link 160. In this scenario, the calculated estimated physical location of the fault generated by each of the management modules 132A-132B may be analyzed together to create an aggregated estimated physical location of the link fault.

Figure 2:
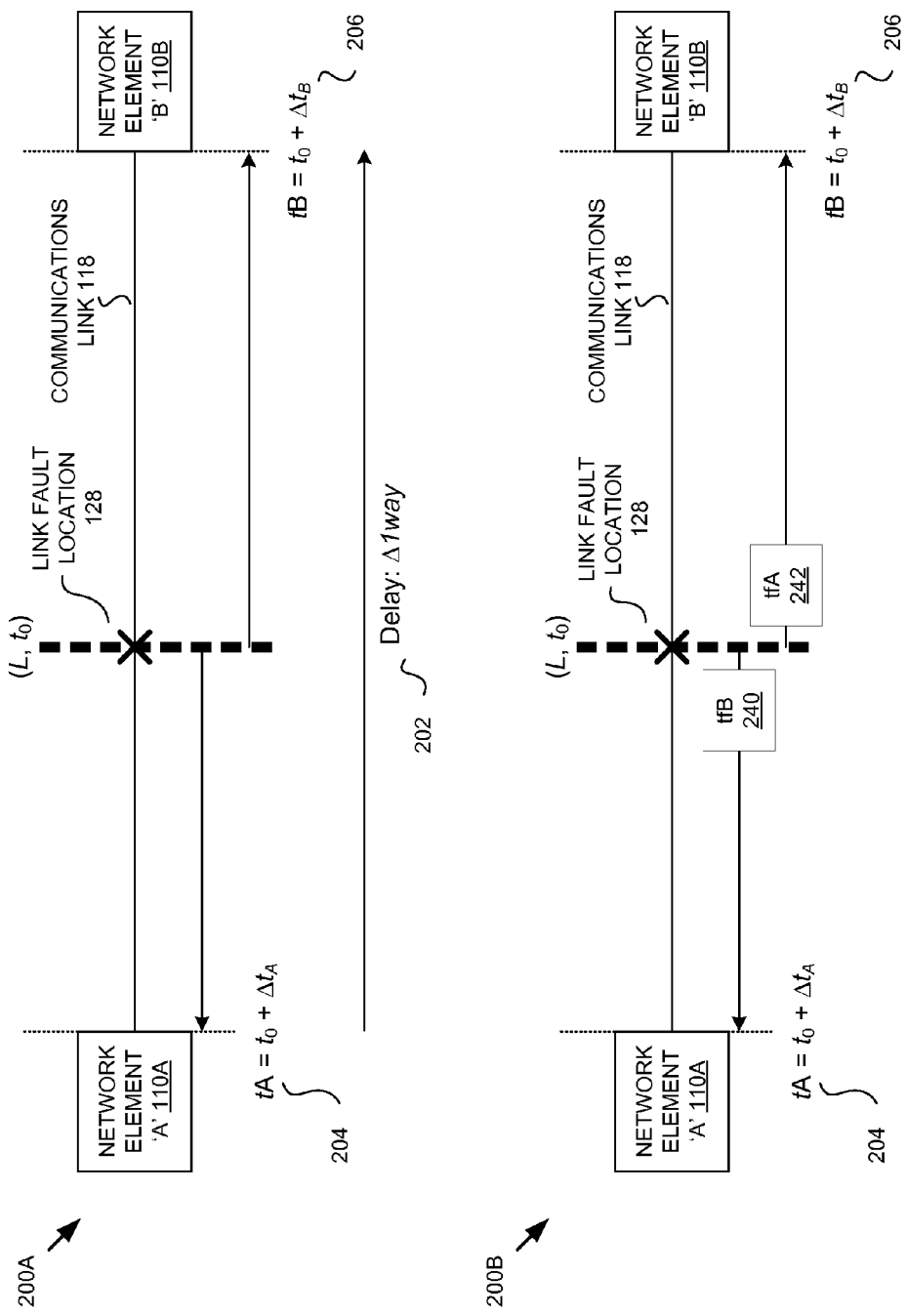
FIG. 2 illustrates an approach for localizing link faults utilizing time value information according to one embodiment of the invention.

FIG. 2 illustrates an approach for localizing link faults utilizing time value information according to one embodiment of the invention. FIG. 2 includes a communications link 118 allowing for two-way communications (e.g. it carries a signal in each direction) between network element 'A' 110A and network element 'B' 110B. Each network element 110A-110B includes a time of day clock module (112A, 112B) that is synchronized to a common frame of reference. In certain embodiments of the invention, this synchronization is provided through one of NTP, Precision Time Protocol, or GPS-based synchronization.

At 200A, at an unknown location "L" and time "t0", the communications link 118 fails, instantaneously and in both directions. Repair of the link 118 is facilitated by determining the location "L" of the failure 128.

The consequence of the failure, such as a loss of signal (LOS) or increased error rate, will propagate to network element 'A' 110A, where it is observed at time "tA"="t0"+"ΔtA", indicated by reference numeral 204. Likewise, the failure is observed at network element 'B' 110B at time "tB"="t0"+"ΔtB", indicated by reference numeral 206. The location of the failure 128 can be determined by a link fault localization module 136 of a management module 132 (not pictured in FIG. 2, and may exist as part of one or both of the network elements 110A-110B, or as part of a separate device) from the value of "ΔtA" and "ΔtB" through the calculation of simple proportions.

In one embodiment, if each network element transmits a continuing series of time stamps to the other network element over the communications link 118, there will be one final time stamp at each end that crosses the failure locus immediately prior to the failure. This final time stamp will be received at the far end of the link by the other network element, which can derive Δt (A or B) by subtracting the received final time stamp value from its own current time.

In another embodiment, the value of "t0" is determined as a step in a derivation of "Δt". The one-way delay 202 of the communications link ("Δ1way" 202) is half of the round-trip time (RTT), which can be measured, e.g. with an OTDR or through a simple loopback, during installation or operation of the communications link and possibly verified/updated from time to time during normal operation thereafter. A synchronization protocol such as IEEE 1588 includes estimation of the RTT or one-way delay. If the synchronization protocol is run over the communications link 118 in question, the RTT may therefore be known as a side effect of synchronization.

Assuming that RTT (and hence Δ1way 202) are known, then:

$$\Delta 1\text{way} = \Delta tA + \Delta tB$$

Then, by substitution:

$$\Delta 1\text{way} = (tA-t0)+(tB-t0) = tA+tB-(2*t0)$$

Therefore, $$t0 = 0.5*(tA+tB-\Delta 1\text{way})$$

So:

$$\Delta tA = tA-t0 = tA-0.5*(tA+tB-\Delta 1\text{way}) = 0.5*(tA-tB+\Delta 1\text{way})$$

$$\Delta tB = tB-t0 = tB-0.5*(tA+tB-\Delta 1\text{way}) = 0.5*(tB-tA+\Delta 1\text{way})$$

The previous equations do not require time stamps, but assume that network elements 110A and 110B are mutually synchronized, that is, that their clocks agree.

As noted above, in an embodiment of the invention each network elements 110A-110B transmits a continuing series of time stamps, thereby avoiding the need for mutual synchronization. For example, consider the example illustrated at 200B wherein the clock domains of network element 'A' 110A and network element 'B' 110B differ by some unknown correction factor "Toffset." Each network element 110A-110B transmits time stamps toward the other on the communication link. In the direction toward network element 'A' 110A, a final time stamp "tfB" 240 passes the fault location 128 immediately prior to the failure. Likewise, a final time stamp "tfA" 242 passes the fault location 128 in the direction from network element 'A' 110A toward network element 'B' 110B.

At network element 110A, the time stamp "tfB" 240 is received at local time "tA", the instant at which network element 'A' 110A observes the occurrence of the failure. In the timing epoch of network element 'A' 110A, tfB should be corrected by adding "Toffset", which is unknown. This may be expressed as:

$$\Delta tA(\text{observed}) = tA-tfB$$

$$\Delta tA(\text{true}) = tA-(tfB+T\text{offset})$$

The corresponding equations at network element 'B' 110B are:

$$\Delta tB(\text{observed}) = tB-tfA$$

$$\Delta tB(\text{true}) = tB-(tfA-T\text{offset})$$

Note that the offset has opposite sign when converting from timing domain of network element 'A' 110A to network element 'B' 110B, as compared to conversion from network element 'B' 110B to network element 'A' 110A.

If all four values are available at a single analysis point, such as at a fault localization module 136, the time stamps may be relocated into their own clock domains and the deltas may be computed separately without the need to know the offset between domains using the following equations:

$$\Delta tA(\text{true}) = tA-tfA$$

$$\Delta tB(\text{true}) = tB-tfB$$

At this point, "Toffset" has dropped out of the computation.

With the relative position of the fault 128 known in the time domain from the perspective of both network element 'A' 110A and network element 'B' 110B, the physical location of the fault may be determined through reference to auxiliary information such as link length or GIS data, and presented to repair personnel as a distance, map coordinates, or in any other form that is meaningful and helpful.

It is to be understood that the accuracy and resolution of this result are affected by a number of factors, including synchronization mismatches between the network elements 110A-110B, uncertainty in the precise instant of a link failure, a non-zero time from the channel starting to fail until it has completely failed, the repetition rate of transmitted time stamps, the time required to send a time stamp at a finite data rate, random errors, and other factors. Those of skill in the art will be able to assess the relative effect of each factor and determine whether the ultimate fault location objective can nevertheless be achieved.

Figure 3:
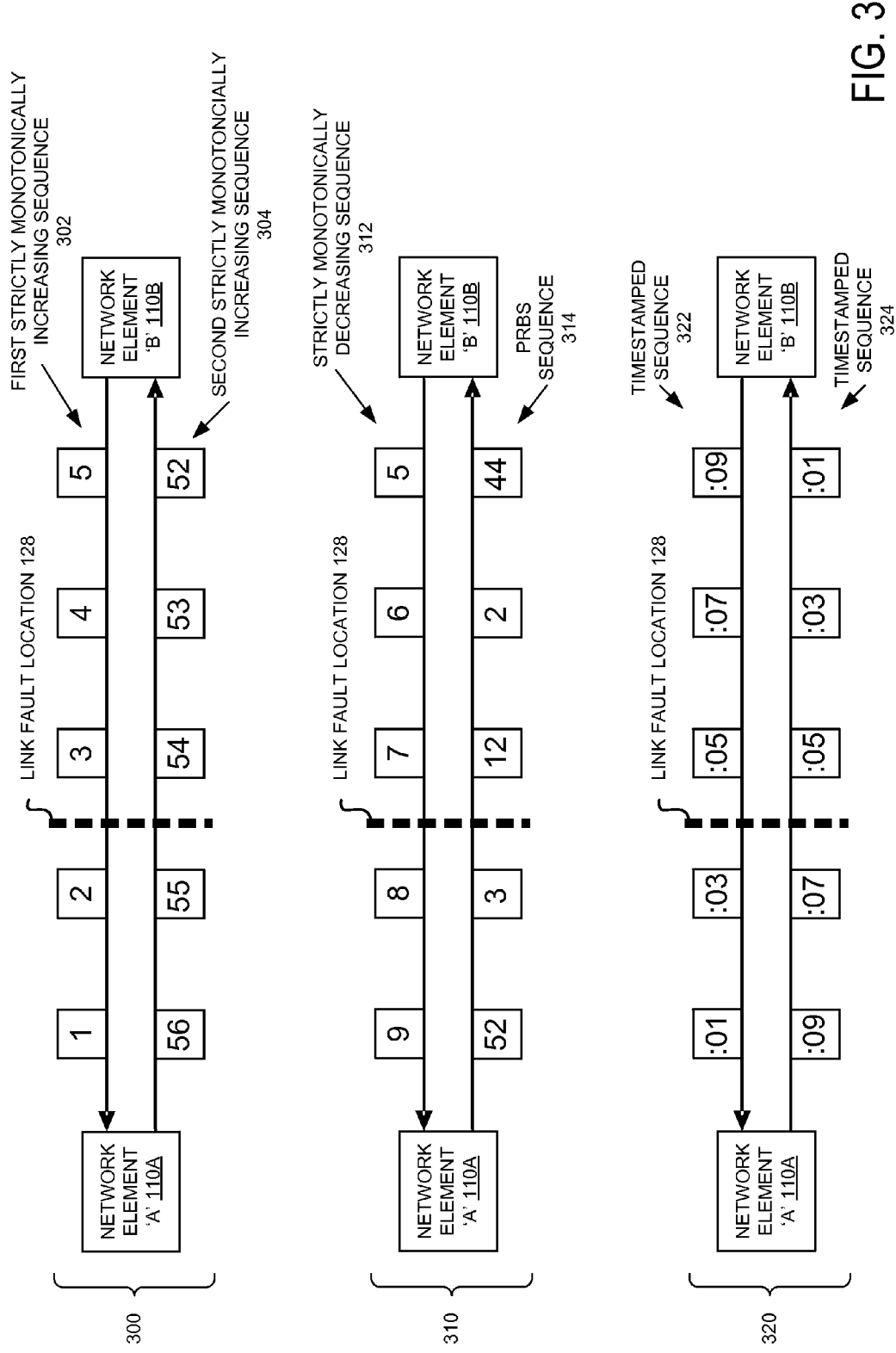
FIG. 3 illustrates the transmission of different types of sequence values and timestamps on a communications link for localizing fault locations according to one embodiment of the invention.

As detailed above with reference to FIG. 1, embodiments of the invention do not need to rely upon time values such as timestamps or generated clock time values (e.g., 124A-124B), but may instead utilize sequence numbers (e.g., 125A-125B). FIG. 3 illustrates the transmission of different types of sequence values used on a communications link for localizing fault locations according to one embodiment of the invention. In such embodiments, one or more sequences of numbers are transmitted between the network elements 110A-110B that allow for the calculation of an estimated link fault location. Embodiments of the invention allow for the use of only one sequence (such as in a tromboned (or looped-back) sequence as depicted in an example of FIG. 4) or a distinct sequence in each direction. These sequences may be simple (e.g. having values that increase or decrease by 1) or may be complex (e.g. a pseudo-random sequence). In example 300, network element 'B' 110B transmits a first strictly monotonically increasing sequence 302 whereas network element 'A' 110A transmits a second strictly monotonically increasing sequence 304. In example 310, network element 'B' 110B transmits a strictly monotonically decreasing sequence 312 whereas network element 'A' 110A transmits a Pseudo-Random Binary Sequence (PRBS) 314. Further, example 320 illustrates a scenario where network element 'B' 110B transmits timestamped packets 322 and network element 'A' 110A also transmits timestamped packets 324 (that may or may not be the same as the other timestamped packets 322). Depending upon the embodiment, the use of timestamped packets (as in example 320) can be treated as a transmission of sequence numbers and use sequence number related formulas instead of time value based formulas.

In most embodiments utilizing sequence numbers (such as those depicted in FIG. 3), the estimated physical location of the link fault may be determined by utilizing the following information: a last valid sequence number received by network element 'A' 110A before it determined that a link fault occurred ("last_valid_A"), the next sequence number about to be transmitted by network element 'A' 110A at the time of the fault determination ("next_A"), a last valid sequence number received by network element 'B' 110B before it determined that a link fault occurred ("last_valid_B"), and a next sequence number about to be transmitted by network element 'B' 110B at the time of the fault determination ("next_B"). These sequence values allow for a first calculation that provides a proportional distance to the link fault (see "prop_fault_dist_from_A" and "prop_fault_dist_from_B" below). This proportional distance is then further able to be transformed to a geographic distance to the link fault through use of additional information related to the communications link (see "geo_fault_dist_from_A" and "geo_fault_dist_from_B" below), including but not limited to one or more of a length of the communications link, a RTT of the link, a propagation speed of the communications link, etc. In some embodiments, the values of "next_A" and "next_B" are not a next sequence number, but the last sequence number transmitted as of the time of the fault determination. In one embodiment, the following equations are utilized:

$$d1 = \text{dist}(\text{next\_}B, \text{last\_valid\_}A)$$

$$d2 = \text{dist}(\text{next\_}A, \text{last\_valid\_}B)$$

$$\text{prop\_fault\_dist\_from\_}A = (d2/(d1+d2))$$

$$\text{prop\_fault\_dist\_from\_}B = (d1/(d1+d2))$$

$$\text{geo\_fault\_dist\_from\_}A = \text{prop\_fault\_dist\_from\_}A * \text{link\_length}$$

$$\text{geo\_fault\_dist\_from\_}B = \text{prop\_fault\_dist\_from\_}B * \text{link\_length}$$

As mentioned above, the function dist( ) is a generic representation of a function that computes a number of sequence steps to move from one sequence number to another sequence number for a particular sequence. Thus, each type of sequence (e.g. 302, 304, 312, 314, etc.) will likely require a different implementation of dist( ). For example, the dist( ) function for the first strictly monotonically increasing sequence 302 where the sequence is an integer sequence increasing by one may be found by simply performing simple subtraction of the two arguments—moving from a value of '3' to a value of '1' requires two sequence steps, which is the same as 3-1. For a PRBS, however, the dist( ) function will be implemented in a number of ways known to those of ordinary skill in the art (such as stepping through the PRBS looking for the sequence numbers while counting the number of intermediate values), and simply needs to return the number of sequence steps to move from one sequence number to another sequence number according to that particular PRBS.

In example 300, the value of last_valid_A is 2, because that is the last sequence number of the first sequence 302 that will validly arrive at network element 'A' 110A. Next, the value of next_A is 59, because when network element 'A' 110A first detects that the sequence number '3' did not arrive properly, network element 'A' 110A was about to transmit '59' to network element 'B' 110B. Similarly, the value of last_valid_B is 54, because that is the last sequence number of the second sequence 304 that will validly arrive at network element 'B' 110B. The value of next_B is 9, as when network element 'B' 110B detects that it did not receive sequence number 55, it was about to transmit a sequence number of 9 as part of the first sequence 302 to network element 'A' 110A.

In this embodiment, the dist( ) function computes a distance with simple subtraction (dist(x,y)=x-y) due to the use of sequences with integers that increase by 1 at each step. Accordingly, d1 will equal 7 (as 9-2=7) and the value of d2 will be 5 (as 59-54=5). Next, a proportional distance may be calculated, and prop_fault_dist_from_A=(5/(5+7))=5/12, which indicates that the link fault is estimated to exist approximately 5/12 of the way from network element 'A' 110A to network element 'B' 110B. Similarly, prop_fault_dist_from_B=(7/(5+7))=7/12, which indicates that the link fault is estimated to exist approximately 7/12 of the way from network element 'B' 110B to network element 'A' 110A. Finally, these proportional distances may be scaled to result in a geographic location of the link fault. In this embodiment, the scaling occurs using a length of the link: assuming that the length of the link (link_length) is 100 meters, then geo_fault_dist_from_A=41.6 meters, and geo_fault_dist_from_B=58.3 meters.

In example 310, the value of last_valid_B=12 and the value of last_valid_A=8. Also, the value of next_B=1, because at the moment in time that network element 'B' 110B determines that the failure has occurred, it was about to transmit a value of '1' as part of the strictly monotonically decreasing sequence 312. However, because the failure detection traffic 120A sent by network element 'A' 110A is a PRBS 314, we will assume that the sequence number three sequence steps after '52' in the PRBS is '18', so next_A=18. Thus, with the dist(x,y) function for d1 being defined as equal to (y−x), d1 will equal 7. However, the dist(x,y) function for d2 is not a simple addition or subtraction, and instead returns the number of sequence steps between the argument values. Accordingly, to find the dist(next_A, last_valid_B) or dist(18, 12), it must be known that going from 12 to 18 is 5 sequence steps of the PRBS 314, so d2=5. Using these values, the result is the same as above in 300 where the link length is 100 meters: geo_fault_dist_from_A=41.6 meters and geo_fault_dist_from_B=58.3 meters.

In some embodiments of the invention, the individual values of the PRBS 314 are broken into bit portions and transmitted bit-by-bit. Thus, while the PRBS 314 of example 310 looks to include a complete PRBS 314 number within each packet, in certain embodiments each packet may only include one bit of the PRBS 314 number. In such an embodiment, each network element 110A-110B is configured to combine this "one bit" from a defined number of consecutive packets/frames (e.g., a sliding window) to form the PRBS number.

For example, consider a scenario where the following bits are transmitted, one per packet: P1=1, P2=0, P3=0, P4=1, P5=0, P6=1, P7=1, P8=0. Assuming a 4-bit PRBS sequence, the sliding window sequence number as of packet P4 is defined as the bits from packets P1 to P4, or 1001b, which is 9 in binary. Then, the sequence number as of packet P5 is defined as the bits from packets P2 to P5, or 0100b in binary, which is 4. This method provides a very efficient way to convey sequence numbers, and although the calculation of the distance between consecutive numbers is not trivial, it is straightforward to implement in software. Further, the generation of such sequences is well known to those skilled in the art.

In an embodiment, a PRBS is generated using a linear feedback shift register (e.g., 138A, 138B), or "LFSR", of a PRBS module (e.g., 135A, 135B), wherein the so-called order of the PRBS is the length of the shift register. A sliding window of size N refers to the N most recent bits emitted by such a generator. One property of such embodiments is that if the sliding window has the same size as the order of the PRBS generator, each instance of the sliding window during one cycle of the generator contains a unique and therefore unambiguous value. Accordingly, distances between PRBS values may be certain and unambiguous, provided that the order of the PRBS and its bit insertion rate suffices to span the transmission delay time of the link before repetition.

As mentioned above, the example of 320 includes a first sequence of timestamps 322 and a second sequence of timestamps 324. In the depicted example, these two sequences are identical, but in other embodiments the sequences need not be identical. In the depicted example, each network element (110A, 110B) transmits each timestamp of the sequence at a particular interval of time ("interval", which here is "02"). In this embodiment, the calculations are the same as above except for the fact that the distance between any two timestamps (i.e. dist(x, y)) is set as equal to ((x−y)/interval). For example, to calculate d1 using next_B="17" and last_valid_A="03", we subtract 3 from 17 and divide by the interval of 02 to get a result of 7.

Figure 9:
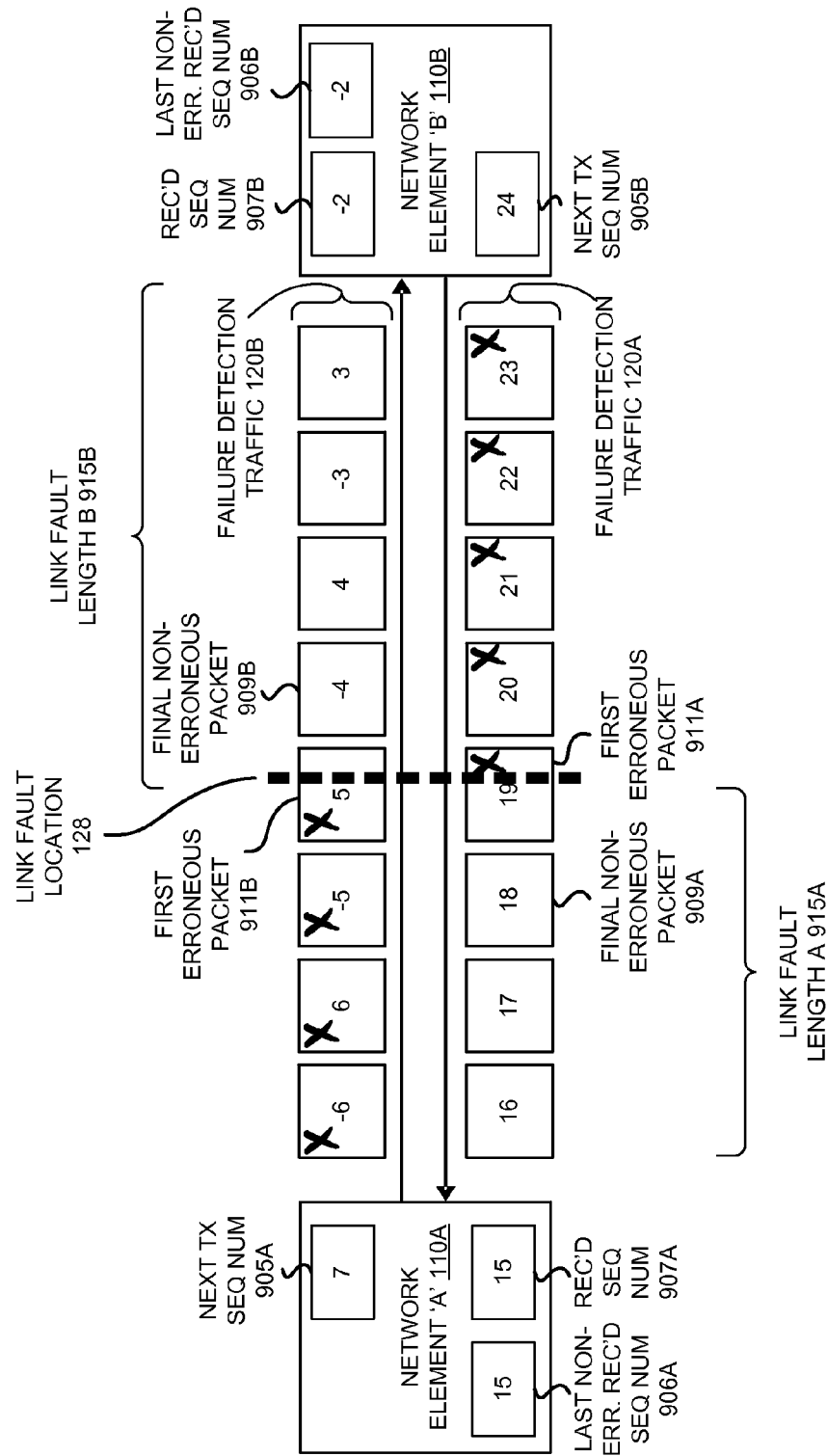
FIG. 9 illustrates an embodiment of the invention utilizing two different sets of sequence numbers as failure detection traffic at a point in time where a link fault occurs.
Figure 10:
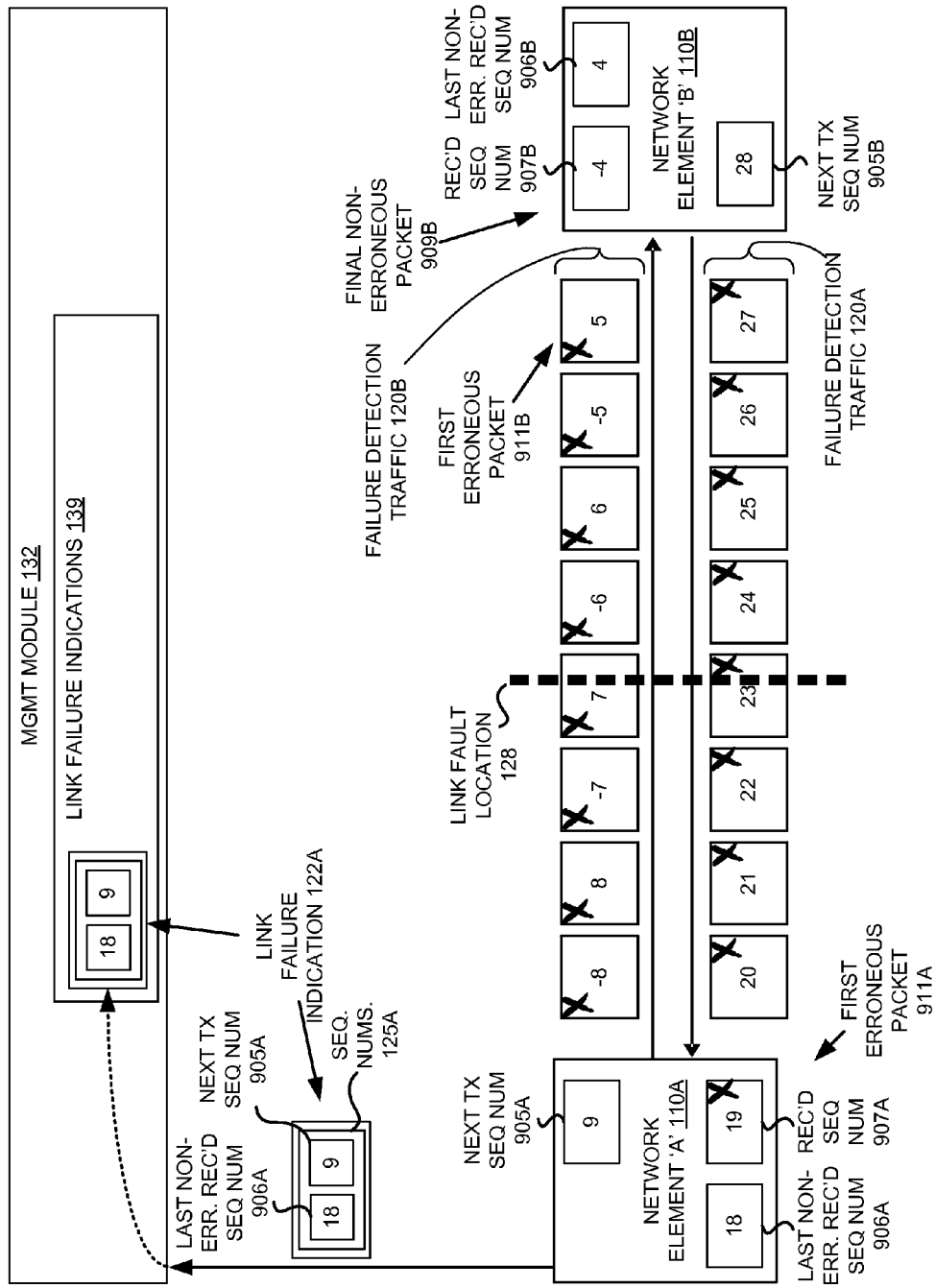
FIG. 10 illustrates the embodiment of FIG. 9 upon network element A detecting the link fault.
Figure 11:
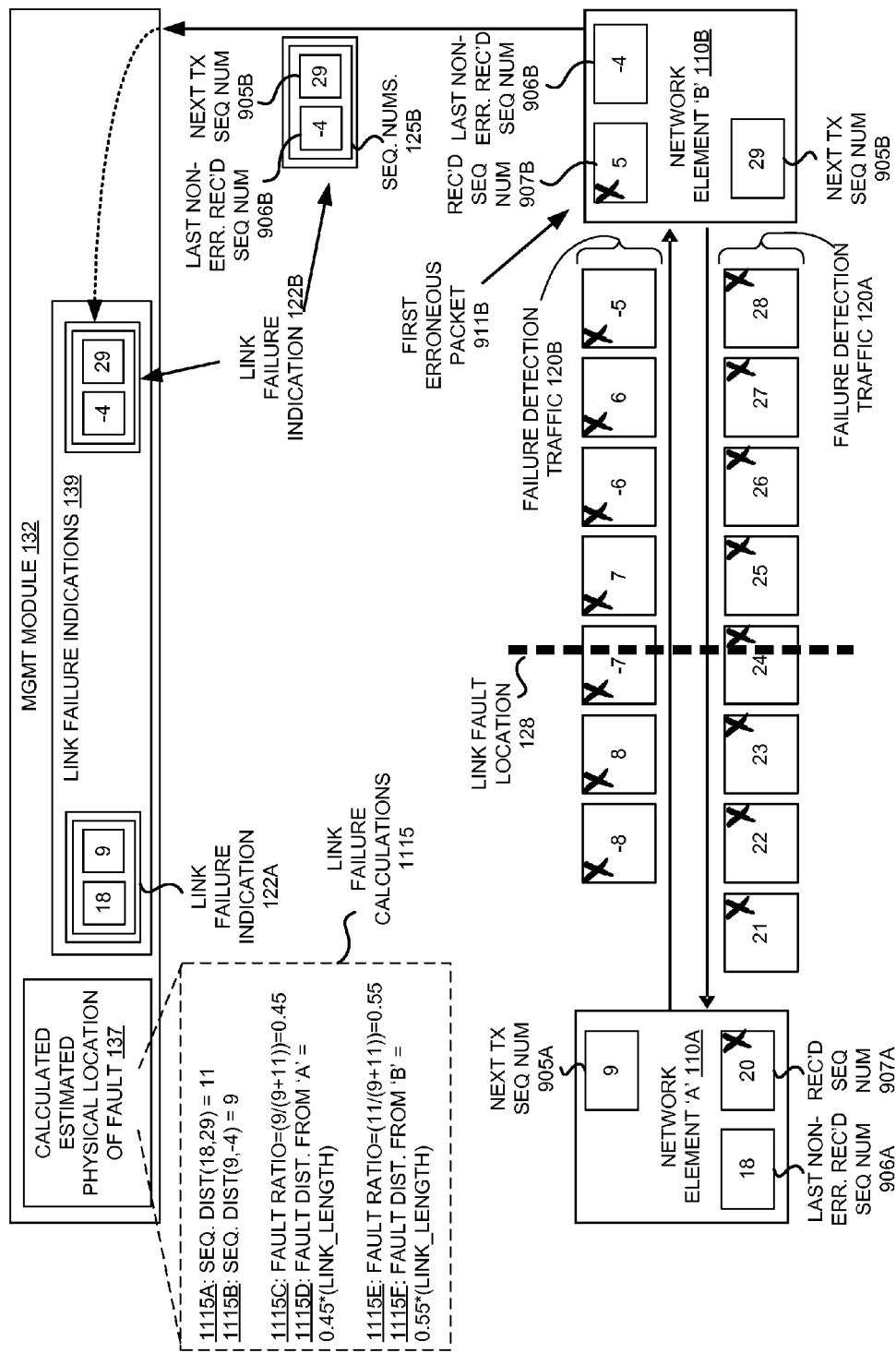
FIG. 11 illustrates the embodiment of FIG. 9 upon network element B detecting the link fault.

Further details regarding these formulas will be presented in an example depicted in FIG. 9, FIG. 10, and FIG. 11.

Figure 4:
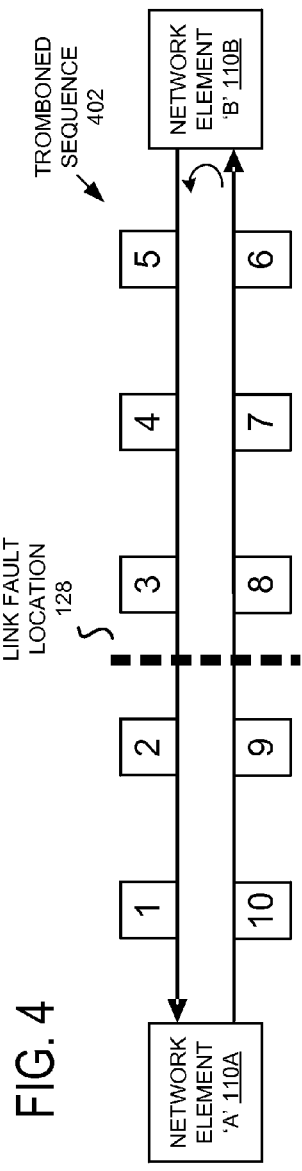
FIG. 4 illustrates the transmission of tromboned (i.e. looped back) sequence values on a communications link according to one embodiment of the invention.

FIG. 4 illustrates the transmission of tromboned (i.e. looped back) sequence values on a communications link according to one embodiment of the invention. The example presented in FIG. 4 includes network element 'A' 110A and network element 'B' 110B transmitting a tromboned set of sequence numbers 402 as the failure detection traffic 120A-120B. In this example, the sequence numbers are deemed "tromboned" because when a sequence number is received by network element 'B' 110B, that same sequence number is then looped (or transmitted) back to the network element 'A' 110A. In this example of FIG. 4, network element 'A' 110A is about to receive a sequence number '1' from network element 'B' 110B, which network element 'A' 110A had sent previously. Soon thereafter, network element 'A' 110A will receive a sequence number '2' from network element 'B' 110A. In this manner, network element 'A' 110A is able to detect whether the communications link is working without a traffic-altering fault because it knows what values it should receive, the order of the values it should receive, and even the approximate time that it should receive each value. For example, because the sequence number '3' is on the wire and located behind the link fault 128, that sequence number will be affected by the link fault 128 and will not arrive at network element 'A' in a correct form. At that point, network element 'A' 110A is enabled to detect that something is likely wrong with the communications link. Similarly, when network element 'B' 110B does not receive the sequence number '9', it too can deduce the likely failure of the communications link, either through knowledge of the transmitted sequence or through simple detection of erroneous traffic on the link.

The embodiment of FIG. 4 may similarly utilize the "sequence-based" formulas for d1, d2, prop_fault_dist_from_A, prop_fault_dist_from_B, geo_fault_dist_from_A, and geo_fault_dist_from_A as described above. Thus, last_valid_B=8 and last_valid_A=2. Similarly, next_A=3 and next_B=9. In this example with tromboned values, the dist( ) function is implemented by taking an absolute value of a result of subtracting the two values: dist(x,y)=|(x−y)|. Accordingly, d1=|9−2|=7, and d2=|3−8|=5, just as in examples 300, 310, and 320 from FIG. 3.

Figure 5:
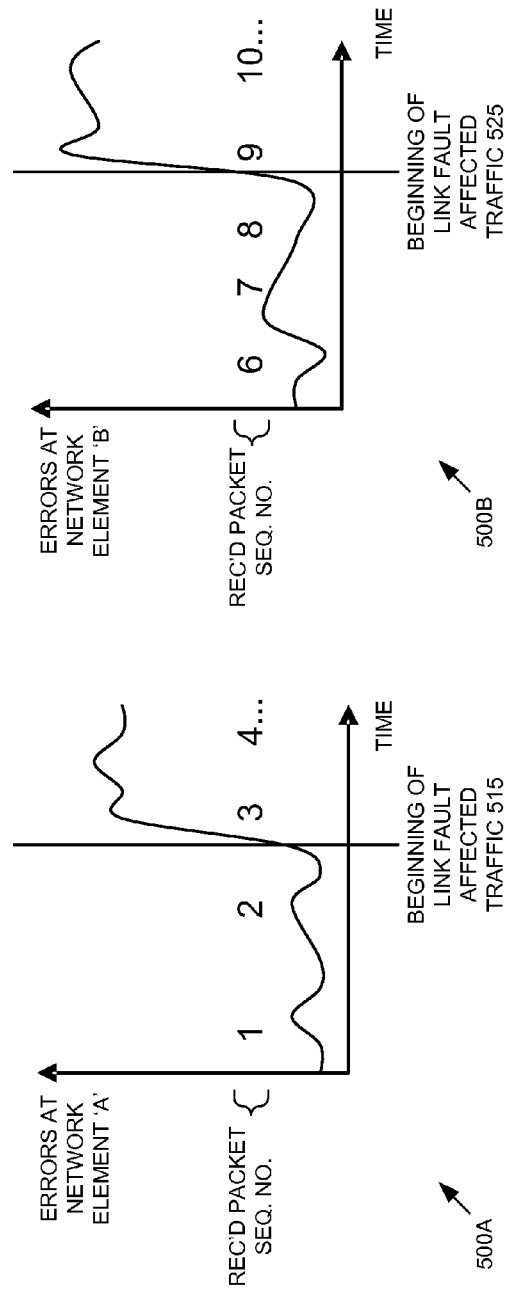
FIG. 5 illustrates observed communications link error characteristics of FIG. 4 from the vantage point of each network element according to one embodiment of the invention.

FIG. 5 illustrates observed communications link error characteristics of FIG. 4 from the vantage point of each network element according to one embodiment of the invention. FIG. 5 includes a first graph 500A illustrating a received error rate from the perspective of network element 'A' 110A as depicted in FIG. 4, and a second graph 500B illustrating a received error rate from the perspective of network element 'B' 110B as depicted in FIG. 4. As is well-known in the art, communications networks typically observe an error rate (e.g., bit error rate) for transmitted traffic due to noise, interference, distortion, or bit synchronization errors. Thus, in typical operating conditions it is common to experience a particular range of percentages of communication errors. When the percentage of errors in received data exceeds a defined range (especially for a sustained period of time), it may be an indication of a fault in the link. In certain embodiments, when link fault affected traffic begins to arrive at a network element, the error rate first spikes and then plateaus (i.e. stays approximately constant).

Each graph 500A-500B in FIG. 5 includes an x-axis indicating time and a y-axis indicating a number of errors observed. Each graph 500A-500B also includes an overlaid set of received packet sequence numbers indicating the approximate points of time in the graph where the corresponding sequence number was received.

In the first graph 500A, as network element 'A' 110A receives sequence numbers '1' and '2', the graph indicates that a relatively small number of errors are occurring, with slight variations in number. However, as network element 'A' 110A begins to receive sequence number '3', the graph suddenly spikes and increases rapidly. This error level remains high throughout the reception of packets having sequence numbers '3', '4', and beyond. In some embodiments, once the error rate indicated by the graph increases to a particular value (indicated at the beginning of the link fault affected traffic 515), a fault is determined as likely having occurred. In other embodiments, once the error rate indicated by the graph rises above a particular value and remains above that value for some defined period of time, a fault is determined as likely having occurred. In this case, assuming recent error rates are maintained, a network element can "backtrack" and identify the beginning of the link fault affected traffic 515. In an embodiment, a timestamp is recorded at the first indication of a fault, and the decision about whether or not a fault has occurred occurs later in time through use of a filtering algorithm. The second graph 500B illustrates the same concepts as the first graph 500A, although from the perspective of network element 'B' 110B. As packets with sequence numbers '6', '7', and '8' are received, the error rate indicated by the graph varies within a relatively low range of error rates. However, as a packet meant to include sequence number '9' arrives, the error rate indicate by the graph suddenly spikes and increases rapidly to a high range of values that remain above the rate of when the beginning of link fault affected traffic 525.

In certain embodiments of the configuration of FIG. 4, each network element (110A-110B) will create link failure indications (122A-122B) containing time values (124A-124B) that are representative of the times when the network elements detected the link fault (instead of reporting the sequence numbers). A link fault localization module 136 will utilize these time values to create a time distance between the time values and then perform scaling to determine a geographic link fault location 128.

Figure 6:
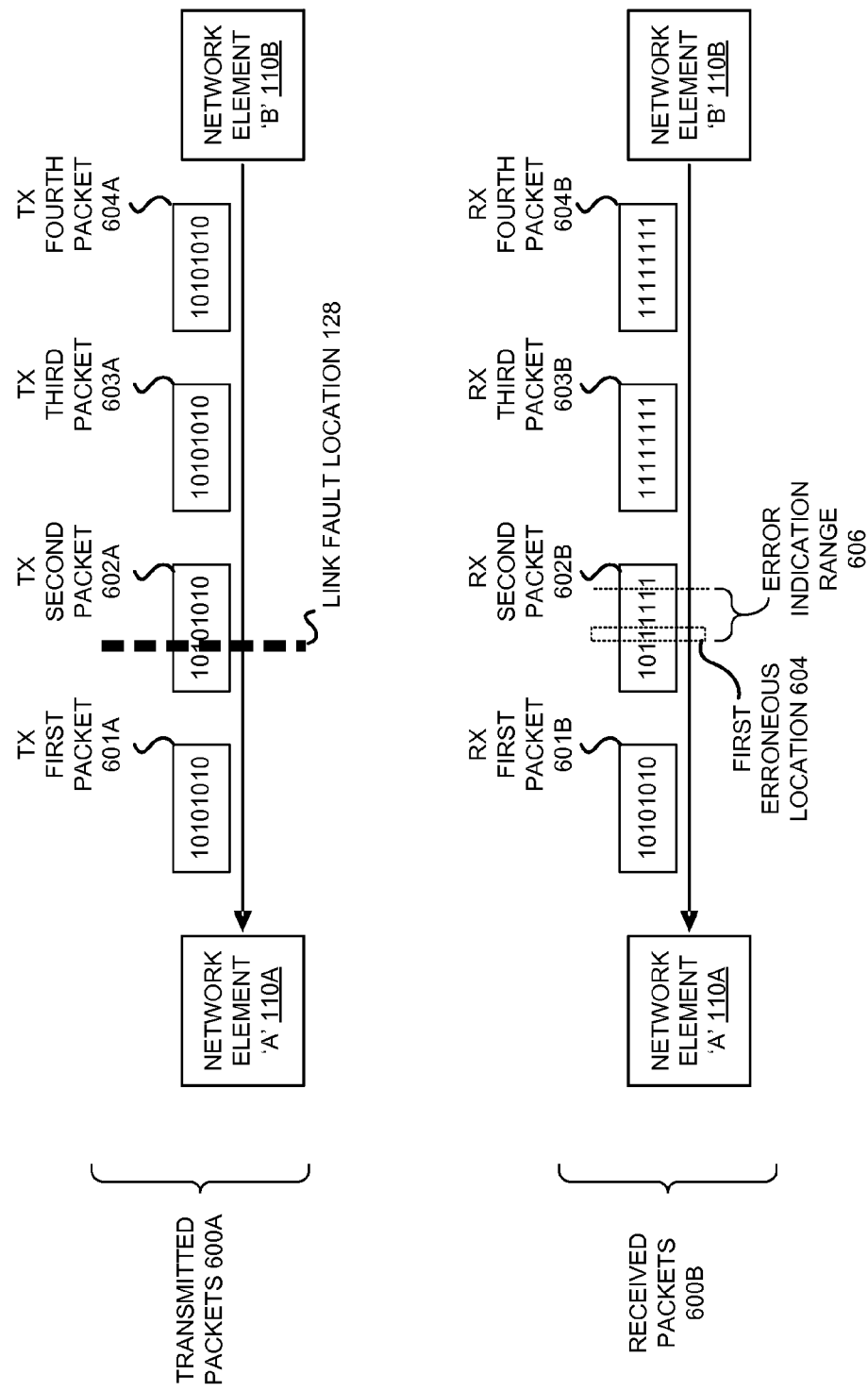
FIG. 6 illustrates localizing link faults utilizing known sequences and intra-packet erroneous locations according to one embodiment of the invention.

FIG. 6 illustrates localizing link faults utilizing known sequences and intra-packet erroneous locations according to one embodiment of the invention. While previous examples illustrated the use of either sequence numbers or timestamps, the depicted example of FIG. 6 may utilize both a known sequence and also time values or timestamps. The packets 600A-600B of FIG. 6 include a pattern of bits that allows for the detection of link faults at a sub-packet level, such as the detection of code-word violations in systems utilizing 8b/10b line encodings or FEC block errors. In this depicted example, the pattern is a simple repetition of a '1' and a '0'. When a configured number of bits are received that are erroneous (i.e. that violate the pattern), the receiving network element may generate a time value to be used in the calculations of the estimated fault location. Alternatively, the receiving network element may utilize a timestamp from within the packet containing the erroneous bits, and adjust that timestamp based upon the location of the first erroneous bits within that packet. This adjusted timestamp may then be used the calculations of the estimated fault location.

Thus, the transmitted packets 600A (as placed on the wire by network element 'B' 110B) include a first packet 601A, a second packet 602A, a third packet 603A, and a fourth packet 604A. Each of these packets 601A-604A includes the same repeating bit pattern, which is illustrated here as '10101010'. However, while on the wire, the link fault 128 occurs as the transmitted second packet 602A is at the point of the fault.

The bottom portion of the illustration depicts a perspective of the transmitted packets 600A from network element 'A' 110A as received packets 600B. While the received first packet 601B is the same as the transmitted first packet 601A, the received second packet 602B is not the same as the transmitted second packet 602A due to the link fault. In this example, the link fault causes all the packets to appear as nothing but '1's. Thus, starting with the third bit of the received second packet 602B, all subsequent bits are '1'. Accordingly, the received third packet 603B and received fourth packet 604B both include bit patterns that are nothing but '1' bits.

In an embodiment, network element 'A' 110A will detect an error with the fourth bit of the received second packet 602B because while it should have been a '0', it instead arrived as a '1'. This is deemed a first erroneous location 604. In an embodiment, network element 'A' 110A is configured to examine a range of bits for errors and determine that a link fault occurred if a particular number of these bits are in error. For example, in the depicted embodiment of FIG. 6, the error indication range 606 could be a set of four consecutive bits, and if two errors are found, it is determined that a link fault occurred. In this depicted scenario, the error indication range 606 should have been '0101' but instead arrives as '1111', so the fault is determined to have occurred. Accordingly, in some embodiments, network element 'A' 110A utilizes a time value associated with the receipt of the first erroneous location 604 of the second received packet 602B as the time value of first discovery of the link fault, but in other embodiments it uses a time value of a time when it detected that the error indication range 606 indicated an error.

Figure 7:
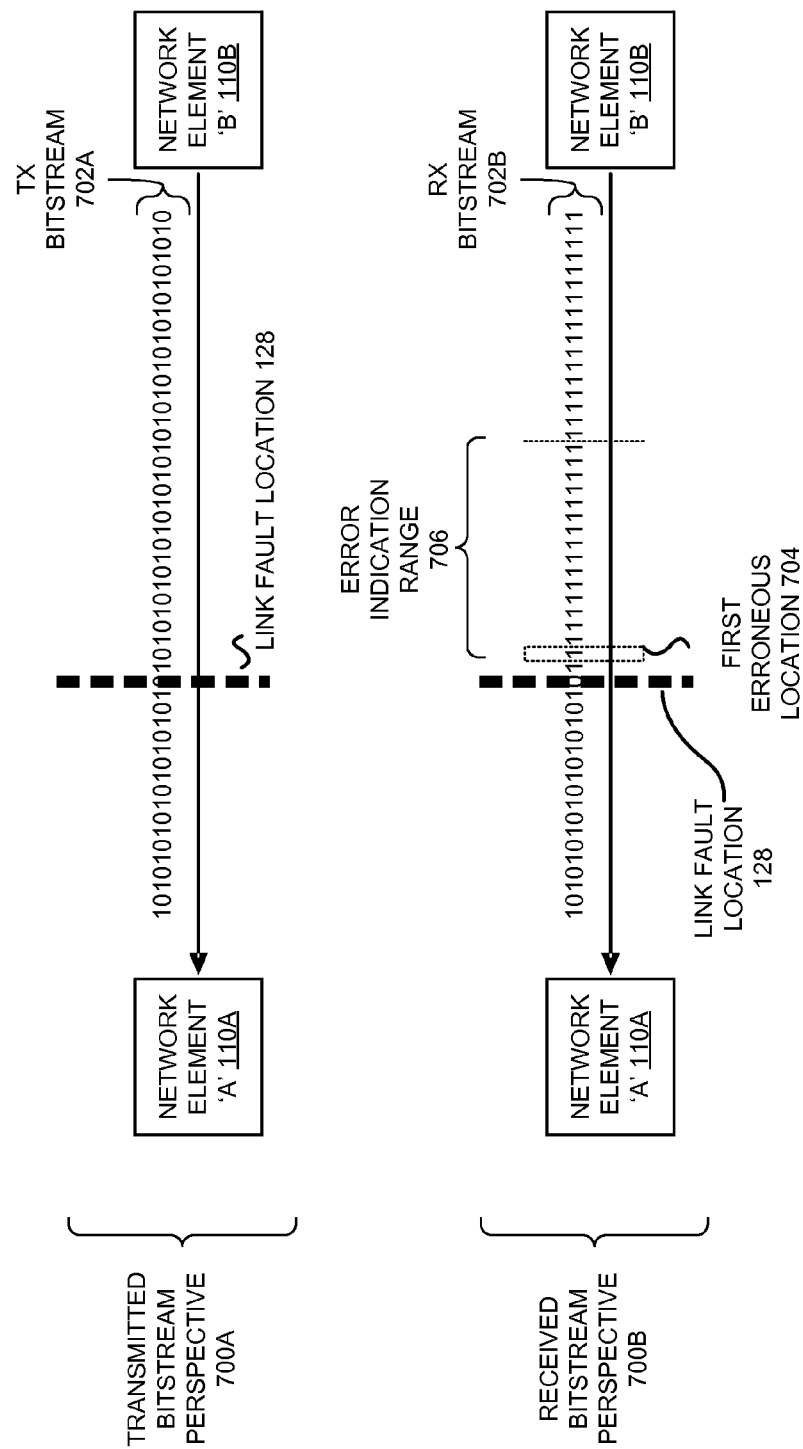
FIG. 7 illustrates localizing link faults utilizing known sequences and erroneous bitstream locations according to one embodiment of the invention.

FIG. 7 illustrates localizing link faults utilizing known sequences and erroneous bitstream locations according to one embodiment of the invention. This embodiment is similar to the embodiment illustrated in FIG. 6 as both utilize a '10' pattern, except the embodiment of FIG. 7 does not utilize separate packets but instead transmits a bitstream 702A of the pattern. The top portion of the figure depicts the transmitted bitstream perspective 700A from the point of view of network element 'B' 110B, which includes a transmitted bitstream 702A pattern of repeating '10' bits. The bottom portion of the figure depicts the received bitstream perspective 700B from the point of view of the network element 'A' 110A, which includes the received bitstream 702B that includes a set of consecutive '1' bits due to the link fault 128. Network element 'A' 110A first observes a bit error at the first erroneous location 704 that contains a '1' where it should have contained a '0' according to the pattern. In an embodiment, network element 'A' 110A continues to look for a particular number of bit errors (e.g., six bit errors) within a particular error indication range 706 (e.g., sixteen bits). In this scenario, there are eight bit errors within the sixteen bit error indication range 706 as all expected '0' bits instead are received as '1' bits, so a link fault is determined. In an embodiment, network element 'A' 110A reports a time value in the link failure indication that indicates the instant when the first erroneous location arrived as the time value 124A (even if the network element was not able to determine that a link fault occurred as of that instant); in other embodiments, network element 'A' 110A reports a time value in the link failure indication that indicates a point when the error indication range 706 was determined to have the requisite number of errors, thus indicating the link fault.

It is to be understood that while FIG. 6 and FIG. 7, as illustrated, include data transmitted from network element 'B' 110B to network element 'A' 110A, in some embodiments similar data (i.e. data adhering to a pattern) is also to be transmitted from network element 'A' 110A to network element 'B' 110B. In some embodiments, the same pattern is used in both directions of transmission; however in other embodiments each pattern may be different.

Figure 8:
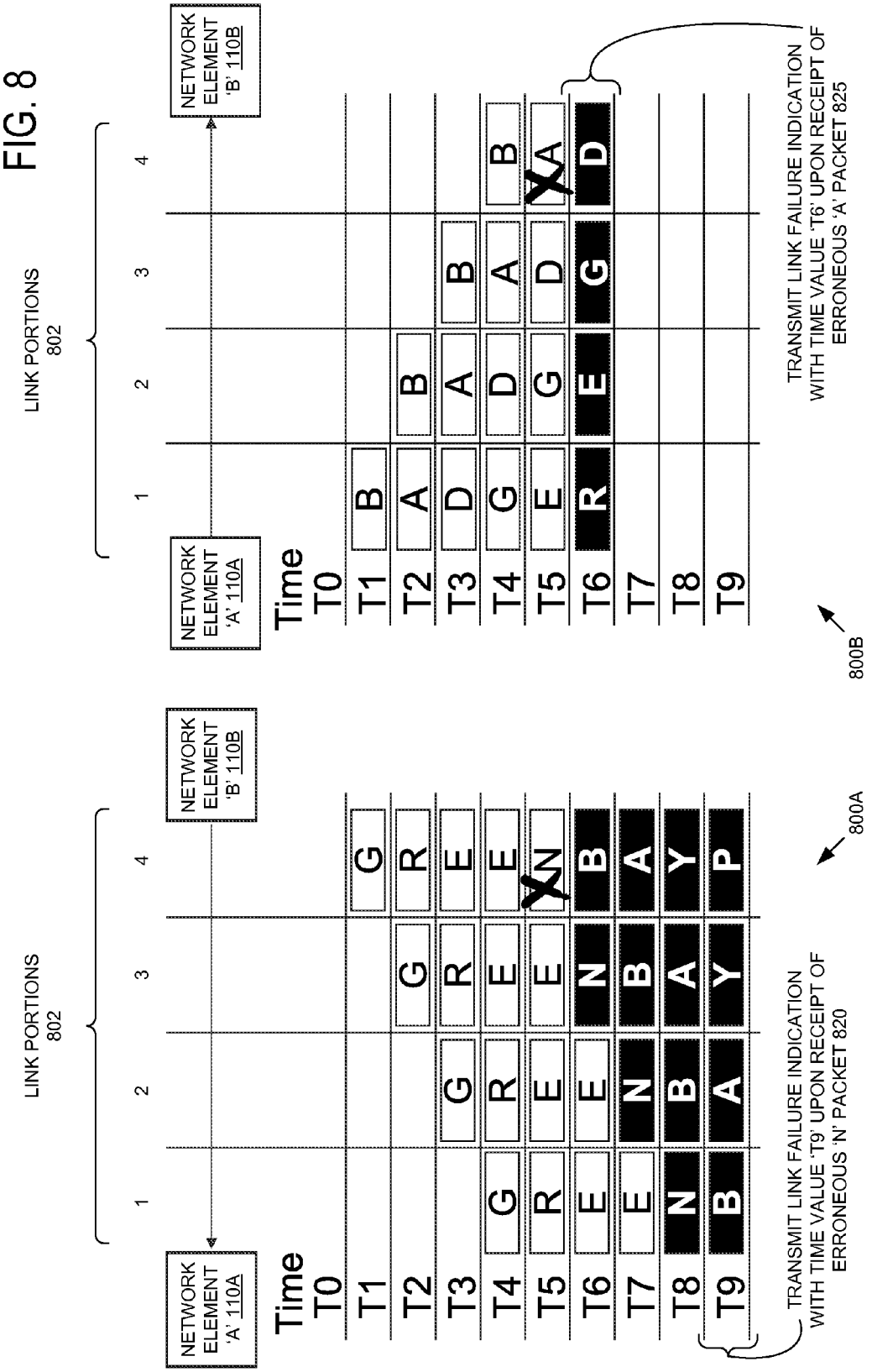
FIG. 8 illustrates the transmission and receipt of sequence values with a link fault over time according to one embodiment of the invention.

FIG. 8 illustrates the transmission and receipt of sequence values with a link fault over time according to one embodiment of the invention. Illustration 800A depicts a sequence being transmitted from network element 'B' 110B to network element 'A' 110A that includes four packets on the communications link at a time, which are spread over four link portions 802. Illustration 800B depicts a different sequence being transmitted from network element 'A' 110A to network element 'B' 110B that also includes four packets on the communications link at a time, which are similarly spread over the four link portions 802. In an embodiment of the invention both sequences are transmitted on a bi-directional channel of the communications link; in other embodiments, the sequences are transmitted on two separate channels of the communications link. In both illustrations 800A-800B, a link fault occurs at time 'T5' somewhere in the fourth link portion. Because the fourth link portion is closer to network element 'B' 110B, then network element 'B' 110B will receive an invalid packet at time 'T6', and may transmit 825 a link failure indication with time value 'T6' upon receipt of that invalid packet.

Network element 'A' 110A eventually detects the link failure at time 'T9' when the invalid packet labeled as 'N' arrives. At that point, network element 'A' transmits 820 a link failure indication including time value 'T9'. Of course, in other embodiments, the network elements 110A-110B both instead transmit one or more sequence numbers instead of time values. The link failure indications are then utilized by the link failure localization module 136 to calculate an estimated physical location of the fault as described elsewhere herein.

FIG. 9, FIG. 10, and FIG. 11 are best understood together as each illustrates different points of time in the operation of an embodiment of the invention. FIG. 9 illustrates an embodiment of the invention utilizing two different sets of sequence numbers as failure detection traffic at the point in time where a link fault occurs. In this embodiment, network element 'A' 110A transmits failure detection traffic 120B including sequence numbers of a sequence x, −x, x+1, −(x+1), x+2, −(x+2), etc. Network element 'B' 110B, on the other hand, transmits failure detection traffic 120A including sequence numbers of a sequence x, x+1, x+2, x+3, etc. Each network element 110A-110B tracks the last received sequence number 907A-907B, the last received valid sequence number 906A-906B, and the next sequence number to be transmitted 905A-905B.

At the depicted point in time, a link fault 128 occurs and will corrupt some of the data on the link that has not crossed the link fault location 128 yet. While network element 'B' 110B will receive the packet having a sequence value '−4' properly as a final non-erroneous packet 909B, it will then receive a first erroneous packet 911B meant to include a sequence value '5'. Similarly, network element 'A' 110A will receive the packet having a sequence value '18' as a final non-erroneous packet 909A, but will then will receive a first erroneous packet 911A meant to include a sequence value '19'. At that point, the link fault localization module 136 (not depicted here) will calculate an estimated location of the link fault represented by or based upon the determined one or more of link fault length 'A' 915A and link fault length 'B' 915B.

FIG. 10 illustrates the embodiment of FIG. 9 upon network element 'A' 110A detecting the link fault. At this point, the sequence number of '19' of the first erroneous packet 911A has been received 907A, and the packet is determined to be invalid. In this embodiment, this triggers network element 'A' 110A to determine that a link fault occurred. In response, network element 'A' 110A transmits a link failure indication 122A to the management module 132 including two sequence numbers 125A: the sequence number of the last non-erroneous received packet 906A (18') as well as the next sequence number to be transmitted 905A at the time of the determination of the link fault (9'). This link failure indication 122A is stored by the management module 132 within a link failure indications 139 storage location.

FIG. 11 illustrates the embodiment of FIG. 9 upon network element 'B' 110B detecting the link fault. At a point in time after network element 'A' 110A detected the link fault (as illustrated in FIG. 10), network element 'B' 110B will detect the link failure when the first erroneous packet 911B (having sequence number '5') arrives. In this embodiment, this triggers network element 'B' 110B to determine that a link fault occurred. In response, network element B' 110B transmits a link failure indication 122B to the management module 132 including two sequence numbers 125B: the sequence number of the last non-erroneous received packet 906B (−4') as well as the next sequence number to be transmitted 905B at the time of the determination of the link fault ('29'). This link failure indication 122B is stored by the management module 132 within a link failure indications 139 storage location.

Having received the link failure indications 122A-122B from each of the network elements 110A-110B, the management module 132 determines a calculated estimated physical location of the link fault 137 by performing link failure calculations 1115. In the depicted embodiment, the management module 132 utilizes a process employing a slight variation of the formulas presented above for d1, d2, prop_fault_dist_from_A, prop_fault_dist_from_B, geo_fault_dist_from_A, and geo_fault_dist_from_B.

At 1115A, the management module 132 determines a sequence distance related to the values from the failure detection traffic 120A sent by network element 'B' 110B. Because this sequence is x, x+1, x+2, etc., the distance between 18 and 29 can be determined by subtraction (i.e. dist(x,y) is implemented as equal to |x−y|), which is 11 (i.e. 'd1'). At 1115B, the management module 132 determines a sequence distance related to the values from the failure detection traffic 120B sent by network element 'A' 110A. Because this sequence is x, −x, x+1, −(x+1), etc., the distance between 9 and −4 is 9 (i.e. 'd2').

As described earlier herein, the management module 132 may calculate link fault distances by first determining a proportional fault distance (or fault ratio) and then scaling the proportion geographically to find a physical fault distance. In 1115C, the management module 132 determines a fault ratio for use in calculating the fault distance from network element 'A' 110A, which is equivalent to (d2/(d1+d2)) or (9/(9+11))=0.45. This value indicates that the failure is 45% of the way from network element 'A' 110A to network element 'B' 110B. At 515D, the management module 132 multiplies this value (0.45) by the length of the link to yield a result indicating a number of units (e.g., meters, kilometers, yards, feet, miles, etc.) away from network element 'A' 110A where the link fault is estimated to exist.

Alternatively, the management module 132 may perform the same calculations to calculate the estimated physical location of the fault with respect to network element 'B' 110B. At 1115E, a fault ratio is calculated that is equivalent to (d1/(d1+d2)) or (11/(9+11))=0.55. This value indicates that the failure is 55% of the way from network element 'B' 110B to network element 'A' 110A. At 1115F, this fault ratio is multiplied by the link length to yield the final result: a value indicating a number of units away from network element 'B' 110B that the link fault is estimated to exist.

In some embodiments, the link fault localization module 136 further utilizes one or more of a computed fault ratio and a computed distance from the fault to either the link midpoint 129 or one of the network elements 110A-110B to make a calculated estimated physical location of the fault be a geographic location. For example, the link fault localization module may utilize geographic data (such as that provided by a Geographic Information System (GIS), or a computerized map of cable routes, etc.) to identify a geographic location (e.g., one or more of latitude, longitude, city, street name, street intersection, building name, location on a map, etc.) where the fault is located. This geographic location may be presented to a user as a graphical map or textual indication by a display of a user equipment device.

Figure 12:
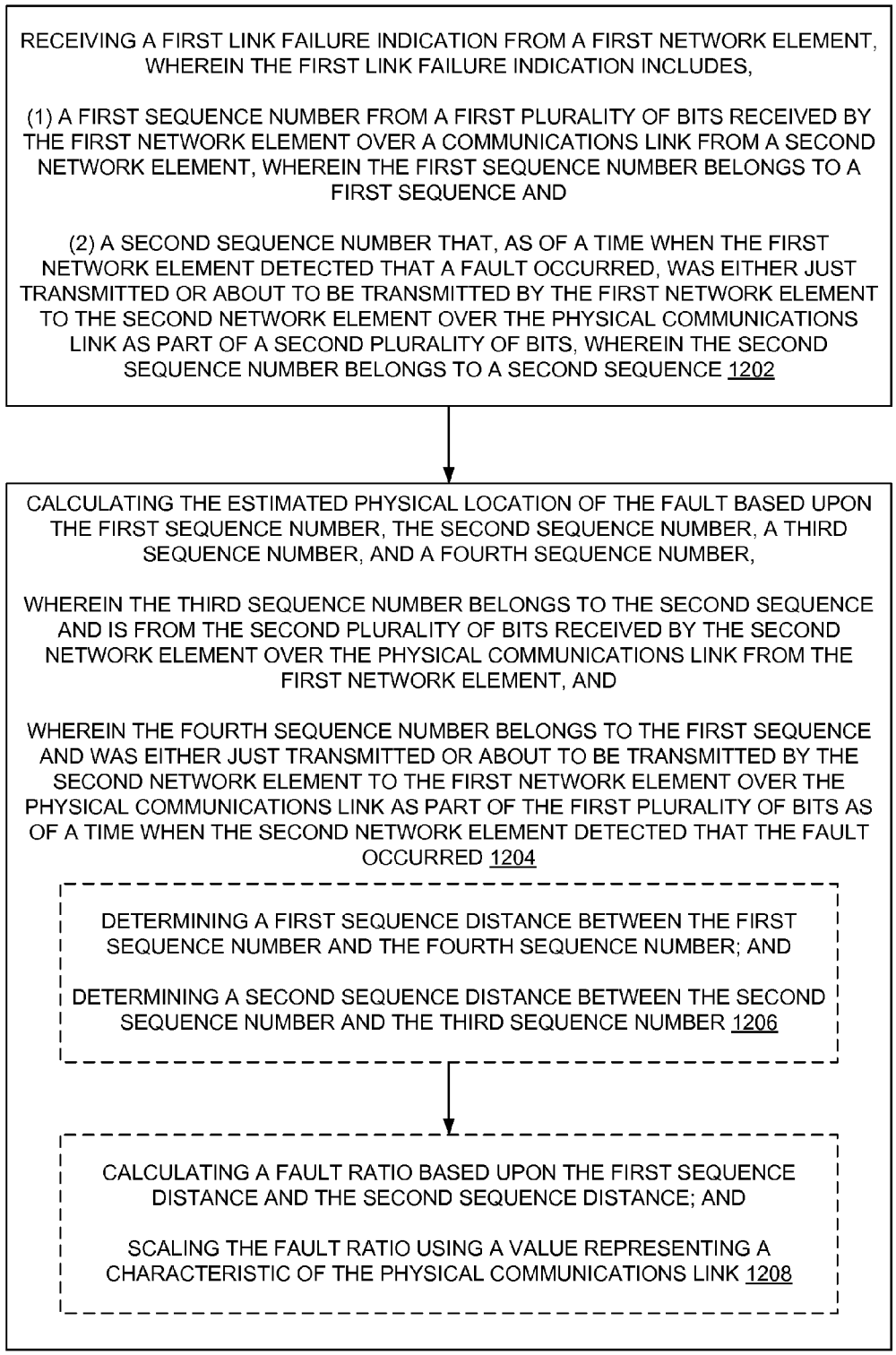
FIG. 12 illustrates a flow for determining an estimated physical location of a fault in a physical communications link through the use of sequence-based information according to one embodiment of the invention.

FIG. 12 illustrates a flow for determining an estimated physical location of a fault in a physical communications link through the use of sequence-based information according to one embodiment of the invention. At 1202, a network element receives a first link failure indication from a first network element. The first link failure indication includes a first sequence number from a first plurality of bits received by the first network element over the physical communications link from the second network element. This first sequence number belongs to a first sequence. The first link failure indication also includes a second sequence number that, as of a time when the first network element detected that the fault occurred, was either just transmitted or about to be transmitted by the first network element to the second network element over the physical communications link as part of a second plurality of bits. The second sequence number belongs to a second sequence.

At 1204, the network element calculates the estimated physical location of the fault based upon the first sequence number, the second sequence number, a third sequence number, and a fourth sequence number. The third sequence number, which belongs to the second sequence, is from the second plurality of bits received by the second network element over the physical communications link from the first network element. The fourth sequence number, which belongs to the first sequence, was either just transmitted or about to be transmitted by the second network element to the first network element over the physical communications link as part of the first plurality of bits as of a time when the second network element detected that the fault occurred.

In an embodiment, the calculation 1204 involves determining a first sequence distance between the first and fourth sequence numbers and determining a second sequence distance between the second and third sequence numbers 1206. Each sequence distance represents a number of steps required to move between two sequence numbers in a particular sequence. In an embodiment, the calculation 1204 further involves calculating a fault ratio based upon the first and second sequence distances, and then scaling the fault ratio using a value representing a characteristic of the physical communications link 1208. This value, in some embodiments, is one of a propagation speed of the physical communications link, a physical length of the physical communications link, and a propagation delay of the physical communications link.

In an embodiment, each of the first, second, third, and fourth pluralities of bits are packets. However, in other embodiments these are frames (e.g., Synchronous Digital Hierarchy (SDH) frames, OTN frames) or portions of bit streams. In other embodiments, these pluralities of bits are taken from portions of line code symbols, such as when the sequence numbers are interleaved, perhaps one bit at a time (or in groups of two or more bits), into traffic through dedicated bits within line code symbols. In other embodiments, the pluralities of bits are taken—one or more at a time—from Forward Error Correction (FEC) code words.

In certain embodiments, the network element calculates the estimated physical location of the fault by determining (1) a first sequence distance between the first sequence number and the fourth sequence number and (2) a second sequence distance between the second sequence number and the third sequence number. In certain embodiments using certain sequences, the sequence distance can be determined by simply subtracting one of the sequence numbers from the other.

In certain embodiments, the network element calculates a fault ratio based upon the first sequence distance and the second sequence distance. The fault ratio indicates a percentage of the link away from one of the first or second network elements that the fault is located at. In certain embodiments, the network element scales the fault ratio by multiplying this fault ratio by a length of the physical communications link to generate a distance, in a particular unit of measurement, away from one of the first or second network elements that the fault is located at. In other embodiments, the fault ratio is scaled using some other value representing a characteristic of the physical communications link, including but not limited to one or more of a distance of the link, a propagation speed of the link, and a propagation delay of the link.

In various embodiments, the sequences used within failure detection traffic 120A and failure detection traffic 120B belong to one sequence or belong to separate sequences. Further, the sequences may be of similar type or of a different type (strictly monotonically increasing integer sequences, strictly monotonically decreasing integer sequences, pseudorandom binary sequences, other patterns, etc.).

The communications link, in some embodiments, is an optical link. In some of these embodiments, the first and second network elements are both wavelength selective switches and the channel is an out-of-band Operations, Administration, and Management (OAM) channel. In other embodiments utilizing a passive optical network (PON), the first network element is an optical line terminal (OLT) and the second network element is an optical network unit (ONU). The PON may utilize time-division multiplexing of a plurality of optical network units (ONUs), wherein each ONU generates timestamps or sequence numbers according to its allocated upstream transmission time. In other embodiments, the network elements are a router, switch, bridge, Optical Transport Network (OTN) switch, etc. In some embodiments, the channel is in-band, meaning the fault detection traffic is sent alongside the data.

In some embodiments utilizing the flow of FIG. 12, the network element performing the flow is the second network element. However, in some other embodiments, the network element performing the flow is neither the first network element nor the second network element.

Figure 13:
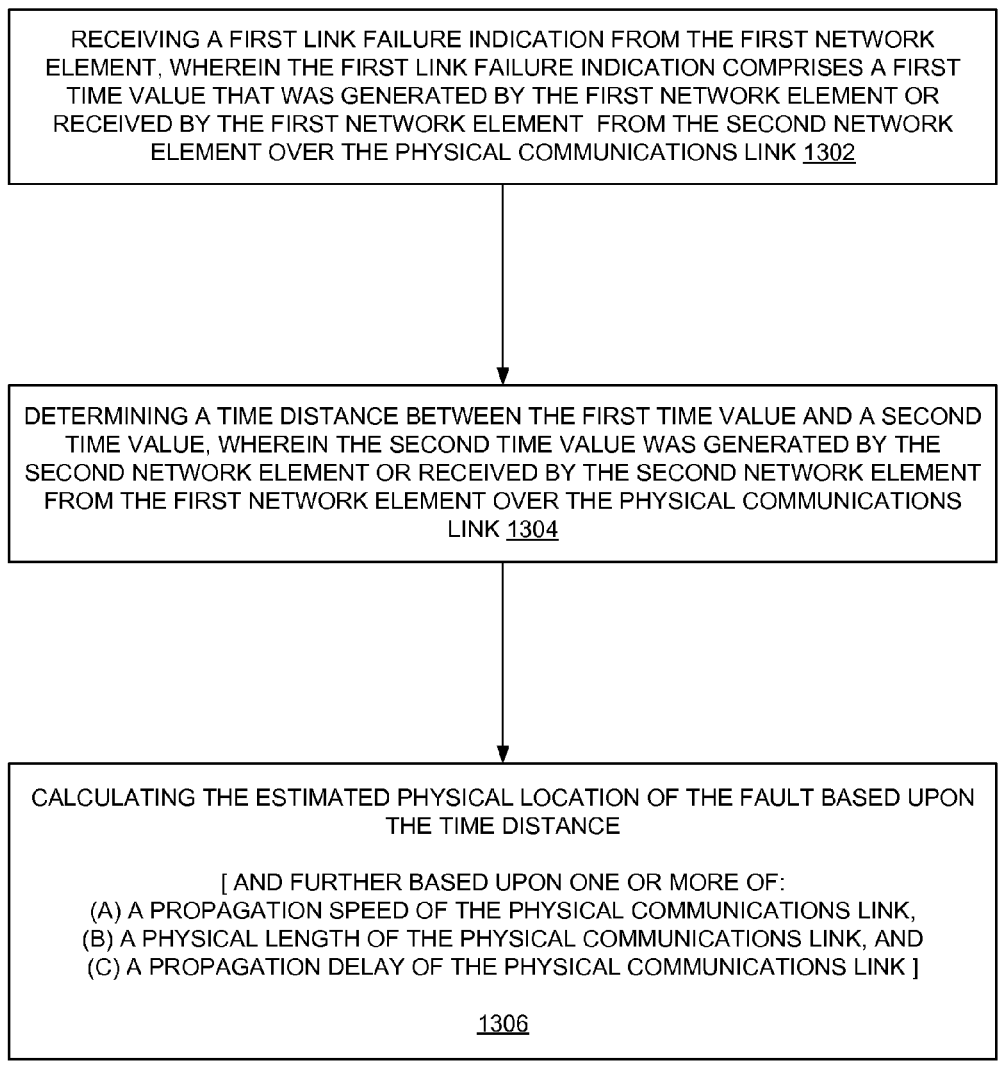
FIG. 13 illustrates a flow for determining an estimated physical location of a fault in a physical communications link through the use of time-based information according to one embodiment of the invention.

FIG. 13 illustrates a flow for determining an estimated physical location of a fault in a physical communications link through the use of time-based information according to one embodiment of the invention. At 1302, a network element receives a first link failure indication from a first network element. The first link failure indication includes a first time value that was either generated by the first network element, or received by the first network element from the second network element over the physical communications link. At 1304, the network element determines a time distance between the first time value of the received first link failure and a second time value. The second time value was generated by the second network element, or received by the second network element from the first network element over the physical communications link. At 1306, the network element calculates the estimated physical location of the fault based upon the determined time value. In an embodiment, this calculation is further based upon one or more of a length of the communications link, a propagation speed of the communications link, and a propagation delay of the communications link.

In certain embodiments, the first time value indicates when the first network element detected that the fault occurred and the second time value indicates when the second network element detected that the fault occurred. This detection, by each of the first and second network elements, may occur when that network element receives one or more packets over the channel of the physical communications link that contain erroneous data (i.e. erroneous bits located anywhere in the packet). The first and second time values may be taken from packets transmitted over the channel, or may be generated by the first and second network elements, respectively.

In certain embodiments, both the first and second network elements utilize a Network Time Protocol (NTP) to keep their respective clocks synchronized, thus enabling any time value that they generate to be synchronized in a common frame of reference. In other embodiments, the network element is configured to place the first and second time values into a common frame of reference.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.). Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for determining an estimated physical location of a fault in a physical communications link utilized by a first network element and a second network element, the method comprising:
   receiving a first link failure indication from the first network element, wherein the first link failure indication comprises a first time value that was received by the first network element from the second network element over the physical communications link;
   determining a time distance between the first time value and a second time value, wherein the second time value was received by the second network element from the first network element over the physical communications link; and
   calculating the estimated physical location of the fault based upon the time distance.

2. The method of claim 1, wherein the method further comprises:
   receiving a third time value, wherein the third time value indicates a time when the first network element detected that the fault occurred; and receiving a fourth time value, wherein the fourth time value indicates a time when the second network element detected that the fault occurred.

3. The method of claim 2, wherein:
the first network element detected that the fault occurred by detecting a first Loss of Signal (LoS) of the physical communications link; and
the second network element detected that the fault occurred by detecting a second LoS of the physical communications link.

4. The method of claim 2, wherein:
the first network element detected that the fault occurred by detecting that at least one packet received over the physical communications link from the second network element contains erroneous data; and
the second network element detected that the fault occurred by detecting that at least one packet received over the physical communications link from the first network element contains erroneous data.

5. The method of claim 1, wherein:
the first time value is a timestamp from within a first packet received by the first network element over the physical communications link prior to the first network element detecting that the fault occurred; and
the second time value is a timestamp from within a second packet received by the second network element over the physical communications link prior to the second network element detecting that the fault occurred.

6. The method of claim 5, wherein the first packet and the second packet are transmitted over the physical communications link on an out-of-band Operations, Administration, and Management (OAM) channel.

7. The method of claim 1, wherein:
the first time value is based upon,
 a timestamp from within a first packet received by the first network element over the physical communications link prior to the first network element detecting that the fault occurred, and
 a first location within the first packet having a value that is erroneous; and
the second time value is based upon,
 a timestamp from within a second packet received by the second network element over the physical communications link prior to the second network element detecting that the fault occurred, and
 a second location within the second packet having a value that is erroneous.

8. The method of claim 1, wherein the first network element and the second network element each synchronize their respective clocks to a common time frame of reference.

9. The method of claim 1, wherein said calculating of the estimated physical location of the fault is further based upon one or more of:
a propagation speed of the physical communications link;
a physical length of the physical communications link; and
a propagation delay of the physical communications link.

10. The method of claim 1, wherein the physical communications link is an optical link.

11. A first network element to determine an estimated physical location of a fault in a physical communications link that is to be utilized by the first network element and a second network element, the first network element comprising:
a set of one or more physical network interfaces configured to:
 transmit, to the second network element, a first plurality of bits over the physical communications link,
 receive, from the second network element, a second plurality of bits over the physical communications link, and
 receive, from the second network element, a first link failure indication that is to include a first time value received by the second network element from the first network element over the physical communications link;
a link fault detection module configured to:
 detect that the fault of the physical communications link has occurred, and
 generate, responsive to said detection, a second link failure indication that is to include a second time value; and
a link fault localization module configured to:
 determine a time distance between the first time value and the second time value, and
 calculate the estimated physical location of the fault based upon the time distance.

12. The first network element of claim 11, wherein the set of one or more physical network interfaces is further configured to receive a third time value, wherein the third time value indicates a time when the second network element detects that the fault occurred; and wherein the link fault detection module is further configured to generate a fourth time value to indicate a time when the first network element detects that the fault occurred.

13. The first network element of claim 11, wherein the link fault detection module is to detect that the fault occurred by being configured to detect a Loss of Signal (LoS) of the physical communications link.

14. The first network element of claim 11, wherein the link fault detection module is to detect that the fault occurred by being configured to detect that at least one set of bits of the second plurality of bits contains erroneous data.

15. The first network element of claim 11, wherein:
the first time value is a timestamp from within a first packet of the first plurality of bits received by the second network element over the physical communications link prior to the second network element detecting that the fault occurred; and
the second time value is a timestamp from within a second packet of the second plurality of bits received by the first network element over the physical communications link prior to said link fault detection module detecting that the fault of the physical communications link occurred.

16. The first network element of claim 11, wherein:
the first time value is based upon,
 a timestamp from within a first packet of the first plurality of bits received by the second network element over the physical communications link prior to the second network element detecting that the fault occurred, and
 a first location within the first packet having a value that is erroneous; and
the second time value is based upon,
 a timestamp from within a second packet of the second plurality of bits received by the first network element over the physical communications link prior to the link fault detection module detecting that the fault occurred, and
 a second location within the second packet having a value that is erroneous.

17. An apparatus to determine an estimated physical location of a fault in a physical communications link to be utilized by a first network element and a second network element, the apparatus comprising:

a set of one or more physical network interfaces configured to:
- receive, from the first network element, a first link failure indication that is to include a first time value that is to be received by the first network element from the second network element over the physical communications link, and
- receive, from the second network element, a second link failure indication that is to include a second time value, wherein the second time value is to be received by the second network element from the first network element over the physical communications link; and a link fault localization module configured to:
- determine a time distance between the first time value and the second time value, and
- calculate the estimated physical location of the fault based upon the time distance.

18. The apparatus of claim 17, wherein the set of one or more physical network interfaces is further configured to:
- receive a third time value, wherein the third time value is to indicate a time when the second network element detects that the fault occurred; and
- receive a fourth time value, wherein the fourth time value is to indicate a time when the first network element detects that the fault occurred.

19. The apparatus of claim 17, wherein:
- the first time value is a timestamp from within a first packet to be received by the first network element over the physical communications link from the second network element prior to the first network element detecting that the fault occurred; and
- the second time value is a timestamp from within a second packet to be received by the second network element over the physical communications link from the first network element prior to the second network element detecting that the fault occurred.

20. The apparatus of claim 19, wherein the first packet and the second packet are transmitted over the physical communications link on an out-of-band Operations, Administration, and Management (OAM) channel.

21. The apparatus of claim 17, wherein:
the first time value is based upon,
- a timestamp from within a first packet received by the first network element over the physical communications link from the second network element prior to the first network element detecting that the fault occurred, and
- a first location within the first packet having a value that is erroneous; and the second time value is based upon,
- a timestamp from within a second packet received by the second network element over the physical communications link from the first network element prior to the second network element detecting that the fault occurred, and
- a second location within the second packet having a value that is erroneous.

22. The apparatus of claim 17, wherein the physical communications link is an optical link.

23. A method performed by a server end station for determining an estimated physical location of a fault in an optical link utilized by a first optical switch and a second optical switch, the method comprising:
- receiving a first link failure indication from the first optical switch, wherein the first link failure indication comprises a first time value that was received by the first optical switch from the second optical switch over the optical link;
- receiving a second link failure indication from the second optical switch, wherein the second link failure indication comprises a second time value that was received by the second optical switch from the first optical switch over the optical link;
- determining a time distance between the first time value and the second time value; and
- calculating the estimated physical location of the fault based upon the time distance.

24. A server end station to determine an estimated physical location of a fault in an optical link utilized by a first optical switch and a second optical switch, the server end station comprising:
a set of one or more physical ports configured to:
- receive, from the first optical switch, a first link failure indication that is to include a first time value that was received by the optical switch from the second optical switch over the optical link, and
- receive, from the second optical switch, a second link failure indication that is to include a second time value that was received by the second optical switch from the first optical switch over the optical link; and a link fault localization module configured to:
- determine a time distance between the first time value and the second time value, and
- calculate the estimated physical location of the fault based upon the time distance.

* * * * *